US009542802B2

(12) United States Patent
Amaitis et al.

(10) Patent No.: US 9,542,802 B2
(45) Date of Patent: Jan. 10, 2017

(54) AMUSEMENT DEVICES AND GAMES INVOLVING MULTIPLE OPERATORS, MULTIPLE PLAYERS, AND/OR MULTIPLE JURISDICTIONS

(75) Inventors: Lee Amaitis, New York, NY (US); Phillip Flaherty, New York, NY (US)

(73) Assignee: CFPH, LLC, New York, NY (US)

( * ) Notice: Subject to any disclaimer, the term of this patent is extended or adjusted under 35 U.S.C. 154(b) by 423 days.

(21) Appl. No.: 13/562,513

(22) Filed: Jul. 31, 2012

(65) Prior Publication Data

US 2013/0172062 A1 Jul. 4, 2013

Related U.S. Application Data

(60) Provisional application No. 61/513,757, filed on Aug. 1, 2011.

(51) Int. Cl.
*A63F 13/00* (2014.01)
*G07F 17/32* (2006.01)

(52) U.S. Cl.
CPC ....... *G07F 17/3244* (2013.01); *G07F 17/3237* (2013.01)

(58) Field of Classification Search
CPC .................... A63F 2300/513; A63F 2300/516; A63F 2300/556; A63F 2300/5566; A63F 2300/5573; G07F 17/3272; G07F 17/3274; G07F 17/3276
USPC ......................................... 463/16, 20, 25, 42
See application file for complete search history.

(56) References Cited

U.S. PATENT DOCUMENTS

| | | | | |
|---|---|---|---|---|
| 2003/0070178 | A1 | 4/2003 | Boyd | |
| 2004/0259631 | A1* | 12/2004 | Katz et al. | 463/25 |
| 2006/0128453 | A1 | 6/2006 | Hoffman | |
| 2006/0205468 | A1 | 9/2006 | Saffari et al. | |
| 2007/0060365 | A1 | 3/2007 | Tien | |
| 2007/0167210 | A1* | 7/2007 | Kelly et al. | 463/16 |
| 2007/0265050 | A1* | 11/2007 | Baazov | 463/13 |
| 2008/0026826 | A1 | 1/2008 | Groswirt | |
| 2008/0032800 | A1 | 2/2008 | Liu et al. | |
| 2008/0051171 | A1 | 2/2008 | Lutnick et al. | |
| 2008/0113816 | A1* | 5/2008 | Mahaffey et al. | 463/42 |
| 2009/0156281 | A1 | 6/2009 | David | |
| 2009/0215527 | A1* | 8/2009 | Lipscomb et al. | 463/25 |
| 2010/0041470 | A1* | 2/2010 | Preisach | 463/25 |
| 2010/0298054 | A1* | 11/2010 | Liber et al. | 463/42 |
| 2012/0004036 | A1* | 1/2012 | Hill | 463/42 |

FOREIGN PATENT DOCUMENTS

JP 2008-522715 7/2008

OTHER PUBLICATIONS

Notification of Transmittal of the International Search Report and the Written Opinion of the International Searching Authority for International Application No. PCT/US12/48967 dated Oct. 19, 2012 (8 pages).

(Continued)

*Primary Examiner* — James S McClellan
(74) *Attorney, Agent, or Firm* — Mark Miller

(57) ABSTRACT

Various methods and apparatus related to gaming are described. Some embodiments relate to a multi-tiered game involving multiple participants. Some embodiments relate to players from a plurality of gaming operators playing games with one another. Other embodiments are described.

20 Claims, 11 Drawing Sheets

(56) References Cited

OTHER PUBLICATIONS

AU First Examiners Report for Application No. 2012290171 dated Aug. 31, 2016; (2 pages).
JP Office Action w/English Translations for Application No. 2014-524027 dated Aug. 9, 2016; (8 pages).

* cited by examiner

AMUSEMENT DEVICES AND GAMES INVOLVING MULTIPLE OPERATORS, MULTIPLE PLAYERS, AND/OR MULTIPLE JURISDICTIONS

This application claims priority to U.S. provisional application 61/513,757, which is hereby incorporated herein by reference.

FIELD

Some embodiments relate to gaming.

BACKGROUND

Casinos may offer one or more games to be played by one or more players. Some games may be played by a single player and some games may be played by multiple players. Some casinos offer poker games at tables allowing players to play poker against other players at the tables.

DETAILED DESCRIPTION

Figure 1:
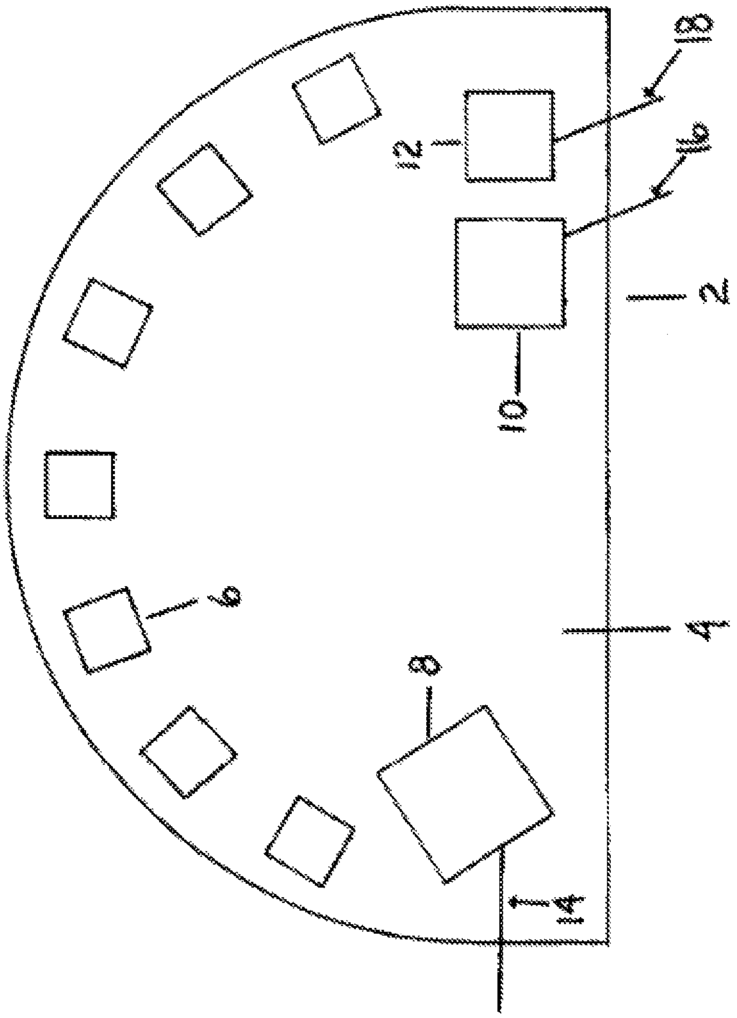
FIG. 1 shows a block diagram of components for a hand-reading system, according to some embodiments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, and a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples:

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples:

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples:

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples:

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around", or play both high and low in the same hand: 3♣ 2♦ A♠ K♠ Q♣ is not a straight, but just ace-high no pair.

Examples:

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples:

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples:

K♥ K♦ 2♣ 2♦ J♥ ("kings up") defeats J♦ J♠ 10♠ 10♣ 9♠ ("jacks up")

9♣ 9♦ 7♦ 7♠ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples:

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples:

A♦ 10♦ 9♠ 5♣ 4♣ ("ace high") defeats K♣ Q♦ J♣ 8♥ 7♥ ("king high")

A♣ Q♣ 7♦ 5♥ 2♣ ("ace-queen") defeats A♦ 10♦ 9♠ 5♣ 4♣ ("ace-ten")

7♠ 6♣ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that may qualify. As the dealer's hand is partially concealed during play (usually only one card, at most) is displayed to the player before player wagering is complete), the player may always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer may hit until he has a point total of at least 17, regardless of what the players have. In most casinos, the dealer may also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIII. Tracking the Action at a Table

U.S. Pat. No. 6,579,181 generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected.

"In a further aspect, the system can include a table monitor that automatically images the activity or events occurring at a gaming table. The system periodically compares images of the gaming table to identify wagering, as well as the appearance, removal and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display may be located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Furthermore, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include a gaming table and a gaming table cloth arranged on the gaming table, the gaming table cloth provided with betting boxes and areas designated for placement of the gaming chips and other areas designated for placement of the playing cards, a card shoe for storage of one or more decks of playing cards, this card shoe including means for drawing individual ones of the playing cards face down so that a card value imprint on the drawn card is not visible to a player of the game of chance, a card recognition means for recognizing this card value imprint on the drawn card from the card shoe, this card recognition means being located in the card shoe, an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively, a gaming bet detector for automatic recognition or manual input of gaming bets, and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arrange over at least two single detectors.

The gaming apparatus may includes automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

XIV. Following the Bets

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system of some embodiments of the invention may encompass. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing, but has more rigid rules as to when hits may be taken by the player and the dealer, and each position may take a maximum of one card as a hit. The hand identification system of some embodiments of the invention may be able to address the needs of identifying hands in each of these types of games and especially may be able to identify hands in the a complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include, but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer may play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the 73$^{rd}$ hand dealt). This date stamping of hands or even cards in memory can be used as an analytical search tool for security and to enhance hand identification.

FIG. 1 shows a block diagram of the minimum components for the hand-reading system on a table 4 of some embodiments, a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-Ball Poker or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

XV. Card Shufflers

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe, and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the method of the present invention.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearward most card in the stack of cards delivered to the dealing shoe. When shuffling and cutting operations are performed subsequent to the initial set-up, the paddle rests against the rearward most card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., “dither”) means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system may be controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

XVI. Casino Countermeasures

Some methods of thwarting card counters include using a large number of decks. Shoes containing 6 or 8 decks are common. The more cards there are, the less variation there is in the proportions of the remaining cards and the harder it is to count them. The player’s advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XVII. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine’s computer and the player is awarded either play credits or a coin payout as determined from a payoff table. This payoff table is stored in the machine’s computer memory and is also displayed on the machine’s screen. Hands with higher poker values are awarded more credits or coins. Very rare poker hands are awarded payoffs of 800-to-1 or higher.

XVIII. Apparatus for Playing Over a Communications System

Figure 2:
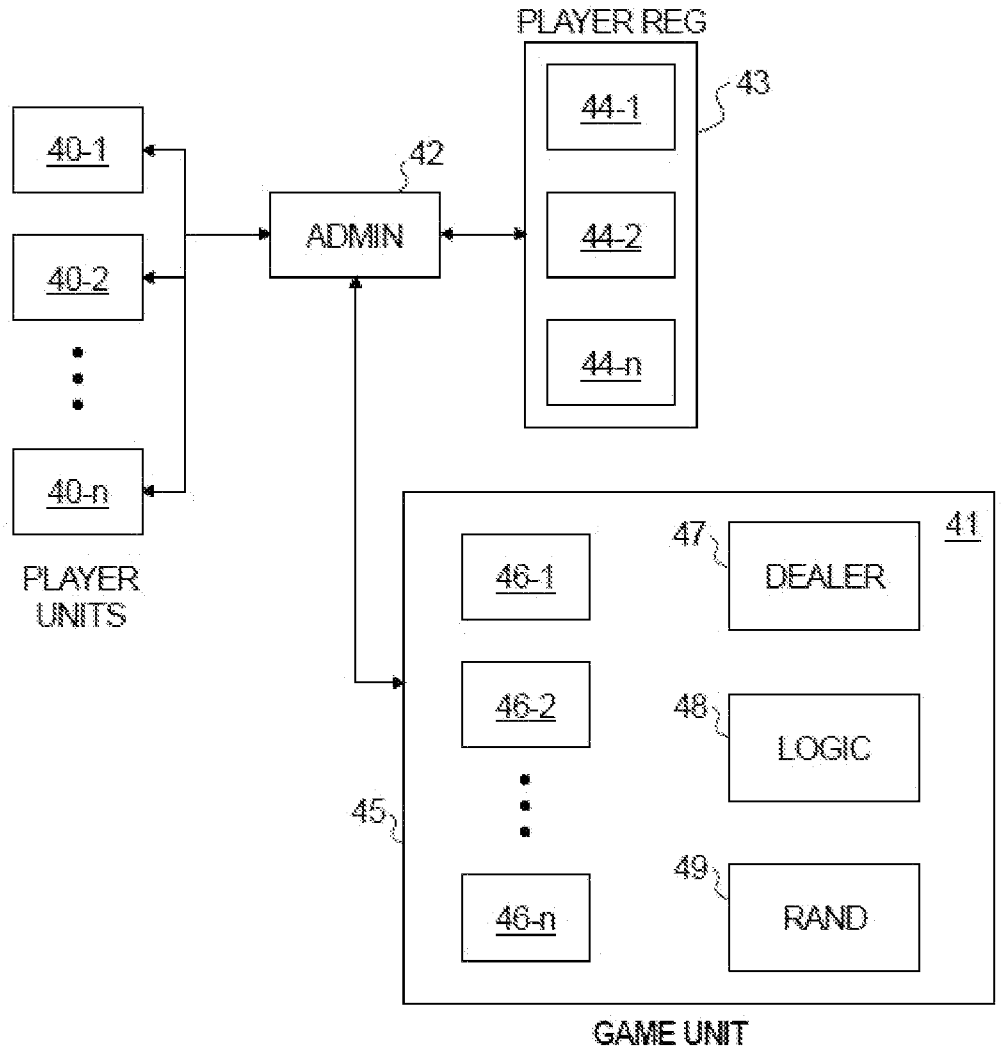
FIG. 2 shows an apparatus for playing a game, according to some embodiments.

FIG. 2 shows apparatus for playing the game. There is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XIX. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XX. References

The following patents and patent applications are hereby incorporated by reference herein for all purposes: U.S. Pat. No. 6,579,181, U.S. Pat. No. 6,299,536, U.S. Pat. No. 6,093,103, U.S. Pat. No. 5,941,769, U.S. Pat. No. 7,114,718, U.S. patent application Ser. No. 10/622,321, U.S. Pat. No. 4,515,367, U.S. Pat. No. 5,000,453, U.S. Pat. No. 7,137,630, U.S. Pat. No. 7,137,629, U.S. patent application Ser. No. 11/063,311.

XXI. Example Embodiments

Some embodiments may include play of a game by one or more players against one or more other players and/or one or more gaming operators (e.g., a computer opponent, a dealer, etc.) Such a game may be part of a competition and/or tiered game. Such a competition and/or tiered game may be continuous and/or ongoing and include players winning the competition and/or tiered game before other players even start. In some embodiments, a first player may play a card game against a second player. Such a game may include a poker game and/or any other card game and/or non-card game (e.g., a sports game, a video game, a casino game, a board game, and so on). In some embodiments that may include a poker game, play of the poker game may include play of a Texas hold 'em game, a stud game, a draw game, and/or any variation of poker desired.

In some embodiments, an AI or bot player (e.g., a player controlled by a computer program) may be added to a game. Such a player may be used to round out a game if there are not enough human players in a game. Such an AI player may take on risk on behalf of one or more gaming operators. For example, losses by such a AI and/or wins by such an AI player may be split among one or more gaming operators (e.g., according to the percentage of players at the table from each gaming operator, evenly among all gaming operators that supply a player to the table, and so on). Some embodiments may not allow such AI players. In some embodiments, such AI player may be added after some period of looking for a human player. In some embodiments, there may be a maximum number of AI players (e.g., 1, 50%, 10%, etc.).

In some embodiments, play of the game may include playing the game until any desired victory and/or loss condition occurs. For example, play may include play of one hand, one round, any number of hands, any number of rounds, a depletion of a player's credits, a player winning a number of times, a player losing an amount of credits, a player dropping below a threshold number of points, a player winning an amount of money, a player losing a number of times, a player winning a number of times, a player choosing to leave a game, and/or any other desired condition. In some embodiments, play may continue until one player collects all of the other player(s) account balance, chips, points, etc. (e.g., that are assigned to a table at a start of a game, that a player is willing to place in play at a table, and so on) through play of any number of rounds (e.g., by winning rounds of play of a poker game in which they are wagered). In some embodiments, players may agree to specific winning and/or losing criteria when they are paired with each other and/or otherwise choose to play a game (e.g., one player may make a virtual table with particular winning and losing rules and another player may choose to join that table).

In some embodiments, play of a game may involve one or more computing devices. Such a computing device may include a computer, a hand held gaming device, a cellular telephone, and so on in any combination. Each player of a game may play such a game on such a device. In some embodiments, such devices may be arranged in a distributed fashion to allow play of the game without a central authority. In some embodiments, such device may act as clients of a central server that performs some and/or all gaming related functions. Such device may take input and pass input to such a server as desired, receive output from a server and display such output as desired. Some embodiments may include any desired distribution of actions between a client and a server.

Various embodiments may include formatting a presentation of information for one or more devices. For example, in some embodiments, a first player may play using a computer or other device and a presentation of information may be formatted for the computer. In some embodiments, a second player may play using a mobile telephone or other computing device and a presentation may be formatted differently for the second player than the first player based on a device being a different device and/or having different capabilities. For example, in some embodiments, a first device may have a lower screen resolution than a second device so in response to a determination as such, a server may transmit information at a lower resolution to the first device than to the second device. In some embodiments, such formatting may take place at a device rather than a central server.

In some embodiments, play of a game may include play of a competition and/or tiered game. A competition and/or tiered game may include a game in which there are multiple tiers of competition. In some embodiments, each tier may relate to a player's skill level, an amount of money, credits, etc. of a player, prior play by the player, and/or any desired characteristic. In some embodiments, players may play with and/or against players in a same tier. There may be any number of tiers as desired. Each tier may relate to a same game and/or different games as desired.

In some embodiments, players may start play in a same initial tier and may change tiers later. In some embodiments, such an initial tier may be different for different players (e.g., based on a buy in amount, prior play, other events, other actions by a player). Such an initial tier may include a lowest level tier of the set of tiers that players may play in. In some embodiments such an initial tier may not be a lowest or a highest level tier. In some embodiments, such a tier may include a highest level tier. In some embodiments, players in an initial tier may be able to play the game using an initial number of credits (e.g., money, dollars, chips) as one another. Such a number may relate to a buy in amount (e.g., an amount a player pays to play a game). For example, the amount may be the buy in amount, the buy in amount minus a fee, the buy in amount minus a progressive contribution, and so on. In some embodiments, players may define their own tables and/or table rules in one or more tiers. In some embodiments table and/or table rules may be imposed on players for one or more tiers. In some embodiments, different tiers may have different rules and/or allow users more control over rules.

Some embodiments may include assigning a player to a tier of game play out of a plurality of tiers of game play. Such assigning may include assigning at a beginning of play in a competition and/or tiered game (e.g., to an initial tier). Such assigning may include assigning in response to a win and/or loss (e.g., changing from one tier to another). Such assigning may be in response to a player buying a change in tier, accepting an offer, and/or performing any desired actions. Such assigning may take place after other players have won a top tier and ended play in the competition and/or tiered game by winning. Accordingly, such winning of the competition and/or tiered game does not end the competition and/or tiered game, but new players may even join after others have won. Some embodiments may enable players to play against other players in a same tier (e.g., in response to a determination that players are in a same tier, allow players to play against one another, match players against one another, enter players into a gaming lobby, start a game, and so on). Some embodiments may prevent players from playing against players in different tiers (e.g., not allow players to select each other, prevent players from joining a same table, preventing players from communicating, and so on).

In some embodiments, players may change tiers based on play of games. For example, a player may move up a tier after winning a game, winning some number of games, winning more than losing by some amount in a current tier, winning all of another player's credits, amassing a number of credits, and so on. For example, in some embodiments, a player may play a one on one poker game and the winner of the poker game may include the player that obtains all of the other player's credits by winning hands of the game. That player in the example may move to a next tier of play. In some embodiments, such as in the example, players may start an initial tier with a same number of credits and therefore and/or may move on to a next tier with a same number of credits. Some embodiments may include determining that a player has performed an action that allows them to move to a next tier (e.g., won a game, amassed a number of credits, purchased a change). In response to such a determination, a player may be moved to a new tier and/or notified that the player may be qualified to move to a new tier.

In some embodiments, a player may move down a tier based on play. For example, a player may move down a tier after a loss, may move down a tier after losing some number of credits, may move down a tier after some number of losses, may move down a tier if losses outnumber wins by some amount in a current tier, losing all of the players credits, and so on. In some embodiments a player moving down a tier may start at the tier with any desired number of credits, such as a standard starting amount for that tier. In some embodiments, a loss (e.g., a loss of credits) may cause a player to lose a tiered competition (e.g., be removed from all tiers of play). Such a player may play another game by buying in to the competition again and starting at an initial tier. In some embodiments, a loser may buy back into a same or different tier. In some embodiments, there may be a maximum number of buy backs. In some embodiments, buying back in may cost a same amount or more than an amount associated with a tier to be bought into and/or than an initial buy in amount. In some embodiments, a fee may increase to buy back in more than once. In some embodiments a loss may send a user down some number of tiers in addition to and/or as an alternative to a required buy in and/or kicking out of a tournament. In some embodiments, a loss may have no effect on a user other than to not advance a user a tier based on the lost game. In some embodiments, in response to an action occurring, a determination may be made that a player should move down a tier.

In some embodiments, a player may pay to move from one tier to another tier. For example, a player may pay a fee to move a tier higher and/or lower. Such a fee may or may not relate to a credit amount associated with the higher and/or lower tier (e.g., the number of credits other players have when beginning to play in the higher and/or lower tier). For example, in some embodiments, such a fee may include a difference between a current credits of the player and the amount associated with the higher and/or lower tier. Such a fee may in part and/or in whole be added and/or subtracted to and/or from credits of the player (e.g., to bring the players credits in line with the amount associated with the higher and/or lower tier). Such a fee may not be added and/or subtracted to and/or from credits of the player (i.e., the player may be at a disadvantage in the higher tier and/or an advantage in the lower tier). In some embodiments a payment may be taken by a house from the fee as desired. In some embodiments, in addition to and/or as an alternative to a fee, a player may play another game, view advertising, perform actions, move to a location, sign up for a program, and/or any other desired action to move to a tier. In some embodiments the tier may be a lower tier and/or higher tier. In some embodiments, the tier may be more than one tier away from a current tier. In some embodiments, there may be no current tier, but rather the player may pay or perform some action to start at a different tier than the initial tier.

Some embodiments may include a top tier. In some embodiments, winning a top tier may include winning against another player in the top tier. In some embodiments, winning at the top tier may result in winning an amount of money that the player has in credits, winning an award, winning a jackpot, winning a progressive award, and so on, For example, in some embodiments, a player that wins in a top tier may win an amount related to the buy in associated with a pyramid of players that were beat or in order for that play to win at the top tier (e.g., each player that that player played against, each player that any of those players played against, and so on and so on). An amount won may equal such an amount, be less than that amount (e.g., that amount minus a house take, and so on as desired. Some embodiments may not include a top tier and/or any tiers at all.

Some embodiments may include a lowest tier. In some embodiments, the lowest tier may include an initial tier. In some embodiments, losing at the lowest tier may cause a player to be removed from a competition. In some embodiments losing at any tier may cause the player to be removed from a competition. Some embodiments may not include a lowest tier and/or any tiers at all. In some embodiments, a player may begin at a tier higher than a lowest tier.

In some embodiments, a house and/or other gaming provider may take some cut of each game, each buy in, each wager, each win, a fee to play, and so on. Such a cut may be placed to make the game operate and/or as revenue for the house. Such a cut may relate to a grand prize amount and/or other winnings amount and a setup of the game so that the house may still make a desired amount of money despite players winning money for play.

In some embodiments, before play of a game, a player may enter a virtual lobby and/or queue to identify that the player wants want to play a game. In some embodiments, in the lobby or queue players may chat with one another. A lobby and/or queue may be specific for a particular tier of play. In some embodiments, a player in a lobby and/or queue may choose another player to play against. In some embodiments, a player in a lobby and/or queue may be randomly and/or otherwise paired against another player to play against. In some embodiments after win of a game and/or loss of a game a player may be placed in a queue and/or lobby for a different tier. In some embodiments, players in a lobby and/or queue may browse available tables and/or games to select one to join. In some embodiments, players in a lobby and/or queue may wait until automatically placed in a new game. In some embodiments, players in a lobby and/or queue may form their own tables for play of a game according to rules that they establish.

Some embodiments may include receiving an indication that a player desires to play a game. Such an indication may include a player entering a virtual lobby, a player selecting a control, a player forming a new table, a player selecting a table, and so on.

Some embodiments may include facilitating play of a game. Such play may include play among and/or between any number of players. In some embodiments, such facilitating may include executing any desired program, accepting input, causing output, determining opponents, and so on. For example, in some embodiments, two opponents may be paired to play a game against one another. An interface may be provided to each player through a computing device to allow the player to view events in the game and/or input actions to be performed in the game. Input may be accepted and/or output may be provided to cause a game to progress through any number of states from start to finish based on player input, random events, game rules, and/or any other desired elements. Such facilitating may take place in response to receiving an indication that one or more of the players in the game desire to play the game. In some embodiments, such facilitating may take place in response to determining that there are a sufficient number of players desiring to play the game in a particular tier of game play. In some embodiments, matching players to play a game may include matching players in a particular tier of game play together. In some embodiments, matching players may include matching players in accordance with a selection and/or formation of a table by one or more of the players.

In some embodiments, a tier may allow substantially continuous play of games as players are available in the tier. For example, when enough players are ready to play in a tier, a game may be played with those players. Accordingly, a player may not be required to wait for all or most players in prior tiers to complete a next tier or even to win a top tier. Rather such a competition may be continuous and/or unending in itself but may allow players to finish while others continue and/or start to play and/or even start to play later. A win of a top tier by one player may have no effect on another players play of the game if that player is not an opponent of the winning player. It should be recognized that any action may take place in any order so that for example some players may end play by winning a tiered game and/or competition before others even begin and/or while others are in the middle of play in the tiered game and/or competition.

Some embodiments may include determining a winner of a game. Such determination may include determining the winner based on events in the game, rules of the game, random events, and so on. For example, in a poker embodiments, a winner may include a player who wins all of the credits in play, wins a hand, and so on.

In some embodiments, any method of collusion detection and/or prevention may be used. In some embodiments, proximity of players and/or devices may be determined and used to prevent pairing and/or play by certain players and/or devices that are too close. For example, in some embodiments, a game may be ended and/or paused in response to a determination that two players participating in the game are within a threshold distance of one another (e.g., 10 feet, 1 foot, 100 feet, 1 inch, etc.). In some embodiments, players may be notified that they are too close and a direction of movement may be identified to rectify the proximity problem. In some embodiments, players may be warned as they approach a threshold (e.g., a light, sound, or other indicator may notify them that they are heading too close to another player and should change course or stop). In some embodiments, players may be prevented from joining a tournament and/or tier if they are too close to other players in the tournament and/or tier.

In some embodiments, elements of a game may be disguised. For example, suits may be changed on cards, player icons and/or names may be changed, and so on. Cards or hands that would lose or win may be altered to other cards and/or hands that would also win. Such disguising may prevent players from knowing they are in the same game. Some embodiments may limit a number of times one player may be paired with another player.

In some embodiments, a player may stop play during and/or after a game. For example, a pair of players may stop play mid game and return to the game later, a player may stop play before playing a game in a new tier, after playing a game in an old tier, and so on. A players position may be remembered (e.g., by a server), and a player may be allowed to return to a same tier and/or game at a later time. In some embodiments, a player's position may decay over time thereby encouraging a player to return sooner rather than later. For example, a number of credits may decrease every hour, a level of tier may decrease every day, and so on. It should be recognized that credits and tiers are given as examples only and that any element of decay may be used. It should be recognized that hours and days are given as examples only and that any term may be used such as seconds years, months, and so on. In some embodiments, a player's credits at a time of stopping play may remain relatively similar upon return.

Some embodiments may include awards provided for moving from one tier to another, winning one or more games, and so on. Such awards may be smaller than an award for winning a top tier game and/or otherwise winning a competition. In some embodiments, a play may be offered an award to drop out of a game rather than continue to play for a higher tier. Some embodiments may include offering an award to change to a lower and/or higher tier. Such a move may include providing an advantage or disadvantage in the new tier (e.g., move to a higher tier with fewer credits than normal for that tier).

It should be recognized that any game may be a basis for a tournament. For example, a random number based game, a skill based game, a single player game, a multiplayer game, and/or any type of game may be used as a basis for a tournament. For example, poker, baccarat, mahjong, pai gow, sic baj, chess, backgammon, and so on may form a basis for a tournament.

In some embodiments, entry into a tournament, and/or a game may be premised on an outcome of another game. In some embodiments, movement form a tier to another tier of a tournament may be made through play of another game. In some embodiments, characteristics of play of a game in a tournament and/or a prize for play of such a game may be adjusted based on play of another game.

Figure 10:
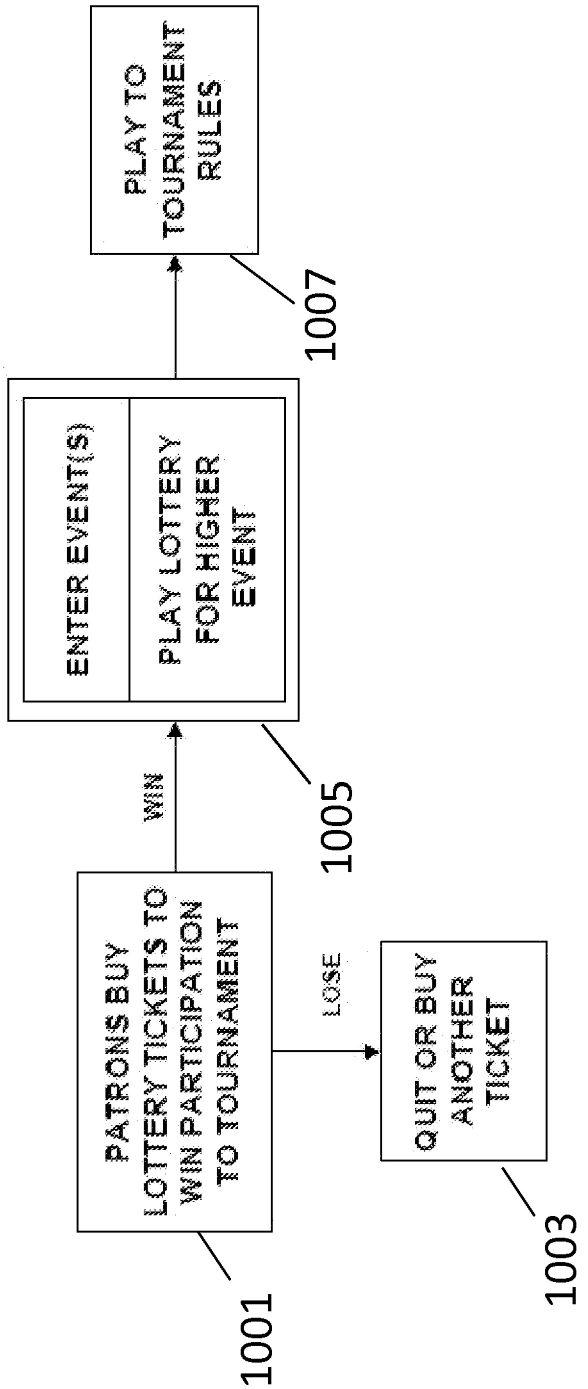
FIG. 10 shows an example method according to some embodiments.

FIG. 10 illustrates an example method in which a lottery may be used to determine eligibility to enter a tournament and/or move from one tier to another of a tournament. It should be recognized that other embodiments may include additional actions, alternative actions, and so on. Other embodiments may not include a lottery and/or a tournament, but may include a different game or games.

As indicated at 1001, a patron may purchase and/or otherwise receive (e.g., through use of points, for free, buy attending an event, as a reward for checking into a hotel, and so on) a lottery entry. Such a ticket may include a series of numbers and/or symbols that may be designated as the player's. In some embodiments, a player may obtain any number of such entries into any number of lotteries as desired. In some embodiments, a player may be limited to a number of entries in a particular lottery. And entry may include a selection of one or more lottery indicia.

Some embodiments may include running one or more lotteries. For example, a lottery drawing may occur once per day, once per hour, based on demand, once per week, when a number of people have obtained entries, every five minutes, and so on. A lottery may be run for a particular gaming operator, for a group of gaming operators that are involved in a tournament, and so on. An entry may be associated with a particular drawing, a next drawing, multiple drawings, and so on as desired. A lottery drawing may include a physical drawing of lottery indicia, a virtual determination of lottery indicia, and/or any determination of one or more results of a lottery.

In some embodiments, money paid as an entry to a lottery may be used as a funding for a tournament jackpot. In some embodiments, an additional entry fee may be required, and/or a buying to a game may be required. For example, in some embodiments, a percentage (e.g., 65%) of money spent as entry into the lottery may be returned to patrons as a jackpot for one or more levels of a tournament.

Some embodiments may include determining whether an entry into a lottery is a winning entry based on a lottery drawing. For example, a comparison between indicia of an entry and indicia of a drawing may be used to determine a winning lottery entry.

As indicated at 1003, in some embodiments, if a lottery entry of a user is a losing entry, a user may not be entered into a tournament or other game. In some embodiments, if a lottery entry of a user is a losing entry, a user may not be given an advantage in a tournament and/or game and/or may not be advanced a tier in a tournament. In some embodiments, if a lottery entry of a user is a losing entry, a user may be removed from a tournament.

As indicated at 1005, in some embodiments, if a lottery entry is a winning entry, a user may be allowed access to a tournament. In some embodiments, if a lottery entry is a winning entry, a user may be granted a bonus in a tournament and/or game. In some embodiments, if a lottery entry is a winning entry, a user may be moved to higher tier of a tournament. In some embodiments, a prize may be provided to the user for winning the lottery. In some embodiments, a winning lottery entry may allow a user to move into a higher tournament (e.g., a tournament with a higher level of payout). In some embodiments, a percentage of players with a closes number to a drawing number may win the lottery. In some embodiments, a player with a number of matching indicia may win the lottery. In some embodiments, a player with all matching indicia may win the lottery. In some embodiments, a percentage of matching number may trigger different prizes (e.g., a player that matches all indicia may be awarded a bonus (e.g., cash, a higher tier level of a tournament, a bonus in the tournament, etc.), any level of matching may be given a different level of award as compared to other levels of matching as desired).

As indicated at 1007, a tournament and/or game may continue according to its rules with the player involved.

Some embodiments may allow a player to establish a virtual table, game, and/or tournament. Establishing such a virtual game related element may include setting rules and/or other characteristics for the element (e.g., rules for a game, rules for a tournament). For example, a player may set a minimum wager, a maximum wager, a minimum balance, a rule regarding rebuying in, victory conditions, a rule regarding elimination from a tournament, a rule regulating tax withholdings, a rule regarding a jackpot, a rule regarding advancement from tier to tier, a rule regarding lowering tiers, a rule regarding speed of game play (e.g., how long a player has to make an action), a rule regarding a number of rounds (e.g., a number of rounds required for a player to win), a rule regarding an amount of money (e.g., an amount of money that a player may be required to accumulate to win a game), and so on. One or more other players may join such a game, table, tournament, and so on to play one or more games according to such one or more characteristics.

Some embodiments may include providing an interface through which a user may establish such characteristics. For example, a player may enter information into such an interface by selecting buttons, entering numbers, and so on. A user may actuate a control (e.g. press a button) to submit information about such characteristics to a central authority (e.g., server, cloud computing system). In response to receiving such information, a central authority may generate such a virtual element (e.g., make database entries, advertise the element, allow others to join the element, perform one or more verifications, and so on).

Existence of a virtual element with one or more characteristics may be presented to one or more players (e.g., through a computing device, through a network, through a kiosk, through a mobile device display, and so on). For example, a listing of existing elements may be presented through an interface to one or more players. Such an interface may allow such players to select an element to join. In some embodiments, a player may be presented with a number of players at the table waiting to play and/or in a queue to a player.

Some embodiments may allow searching for such elements. For example, other players may be allowed to search for existing elements based on characteristics of the elements. For example, a player may search for a table with a particular minimum wager by entering such a search criteria into a search interface. If such a virtual table has been created that meets the criteria, the searching player may be presented with such a matching table or tables (e.g., an indication of such tables). If not, the player may be presented with an indication that no such table exists. A player may generate a new table with such characteristics in some embodiments.

In some embodiments, a player may choose to join an element with desired characteristics. Such an element may include an element created by another player and/or an element created by a gaming operator (e.g., a default table, a casino wide tournament, etc.). A player may enter information through an interface that displays one or more available elements to the player to submit such a choice to a gaming operator (e.g., transmit form a computing device to a central service). In response to choosing to join an element, a player may be matched with another player that created the element and/or also chose to join the element, placed in a queue for the table, placed in a seat at a table to await an opponent and so on.

In some embodiments, players may make, choose, and/or search for an element within a tournament. For example, a player in a particular tier of a tournament may search for and/or make a table in a particular tier that has desired characteristics. In some embodiments, there may be no tiers and players may make, search for and/or join tables at large.

In response to a second player choosing an element, a first and second player may be matched against one another for game play. Such game play may be carried out in accordance with one or more criteria established for the element. Some embodiments may include facilitating game play between two players. In some embodiments, a game may include a two player poker game. In some embodiments, game play may include making wagers by one or more players in a game, taking actions in one or more games by one or more players, and so on. In some embodiments, a determination may be made that a wager and/or action is in accordance with requirements of a criteria established for an element. An action and/or wager may be allowed in response to such a determination and/or prevented in response to an action and/or wager not being in accordance with such requirements.

In some embodiments, one or more players may disconnect from a gaming service (e.g., a battery may die, a connection issue, and so on) while engaged in play of a game. In response to such a disconnect a gaming operating may take any desired actions. For example, a gaming operator may end a game, may pause a game, may take actions on behalf of one or more disconnected players in a game, and so on. For example, in some embodiments, a gaming operator may check and/or fold at each opportunity in a game when a player may be required to take an action in a poker game if the player required to take an action has been disconnected. Such an action may be taken after some waiting period whenever such an action is required (e.g., at each round, when a player is required to make a bet or fold, a gaming operator may make a player match a prior player's bet and/or fold after waiting a minute for the player to reconnect). Actions may be taken in accordance with a strategy, such as a basic strategy in a blackjack game. For example, a gaming operator may hit and/or stand in a blackjack game according to the basic strategy, and so on. In some embodiments, if rules for a game allow a player to leave a game and/or table a gaming operator may cause a player to do so. For example, a player may be caused to walk away from a table at the end of a hand. In some embodiments, such leaving a game, table, and/or tournament may thereby cause a transferring of remaining credits out of a table, game, tournament, etc. account and into a general and/or wagering account. In some embodiments, such leaving may thereby cause a forfeit of a game, tournament, etc. and/or a loss of credits associated with such a game, tournament, and so on.

In some embodiments, when a player joins a element and/or is matched against another player, money and/or credits may be transferred from one account (e.g., a wagering account, a bank account, a credit card) to a game account (e.g., a set of money available to pay the game). The money and/or credits may be the whole amount in the account, a smaller amount than is in the account, an amount set by rules of an element, and so on. In some embodiments, at the end of a game or tournament, winnings may be transferred back to the account from the game account. In some embodiments, remaining amount in a game account may be transferred to the account. In some embodiments, a user may be allowed to buy back into a game table by transferring more money into the game account if a user runs out of money in a game account. Such ability may be governed by rules governing a virtual table.

It should be understood that various examples are non-limiting, and that various embodiments may include some, none, more, different, and so on elements as described herein.

Figure 3:
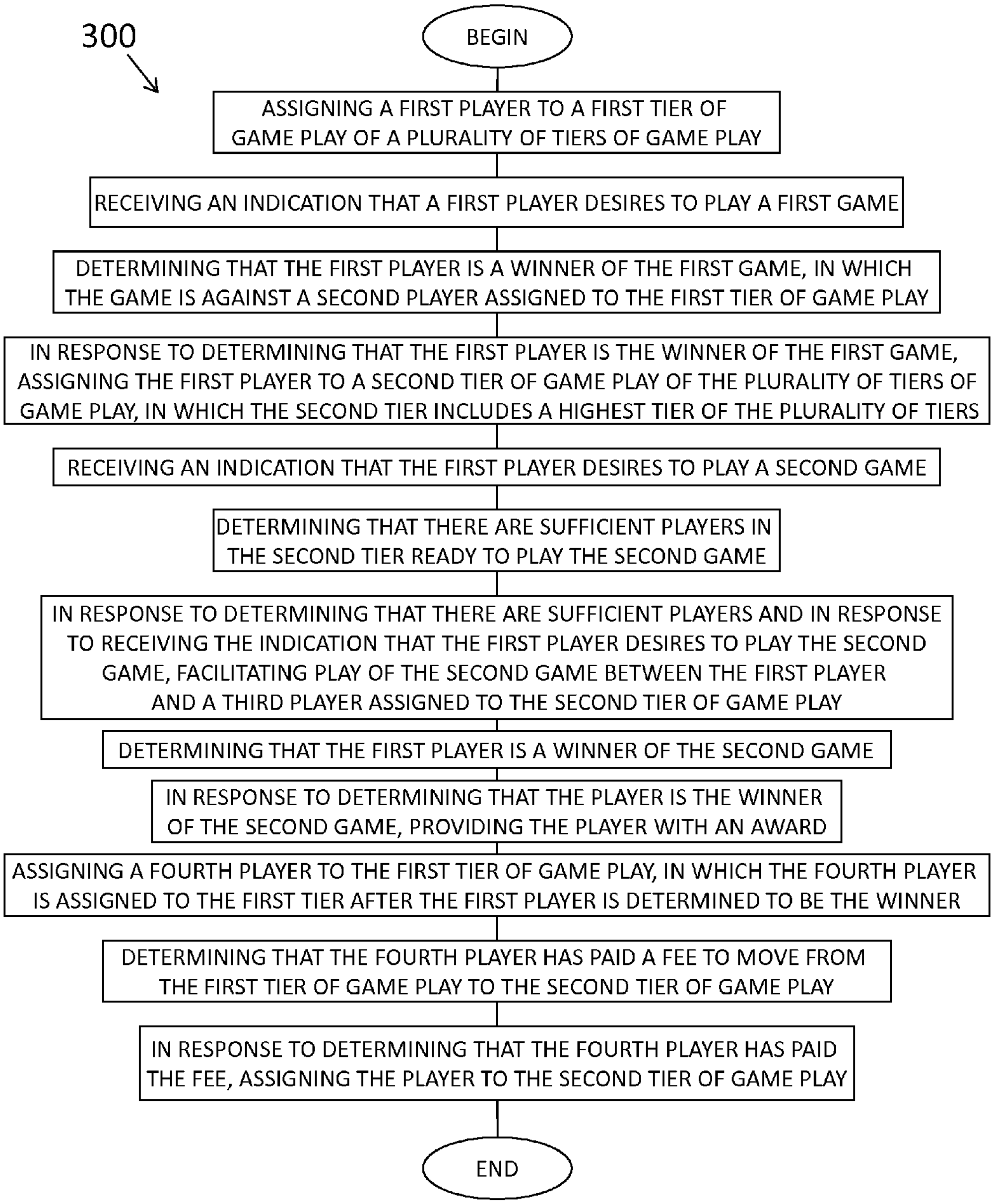
FIG. 3 shows an example method according to some embodiments.
Figure 4:
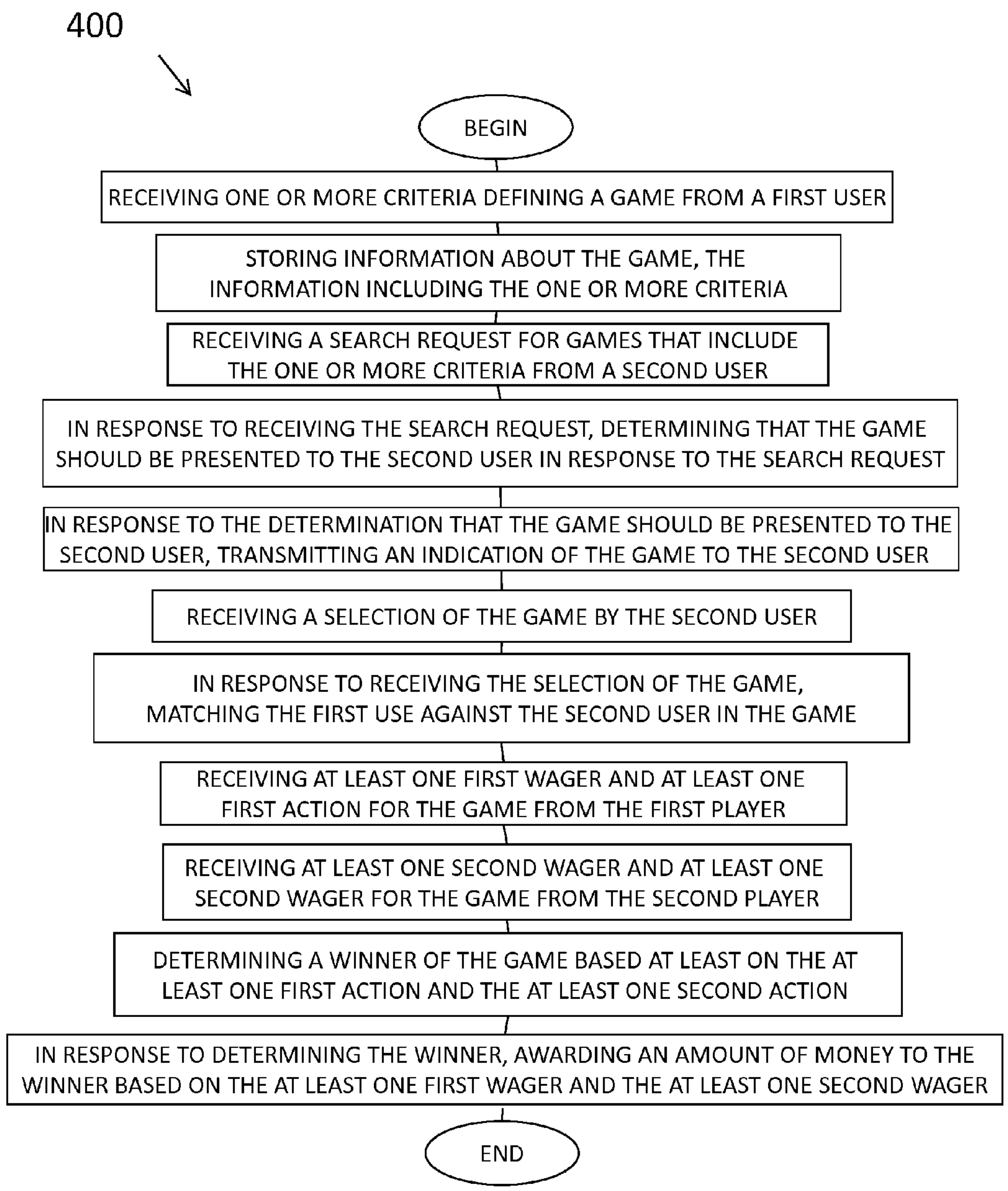
FIG. 4 shows an example method according to some embodiments.

FIG. 3 illustrates an example method 300 that may be performed in some embodiments. FIG. 4 illustrates an example method 400 that may be performed in some embodiments. It should be recognized that the processes may be performed by any desired entity, in any desired order, in any desired combination, with same, different, additional, alternative, and so on elements. It should be recognized that some embodiments may include different, fewer, more, alternative, no, the same, and so on actions as desired.

Figure 5:
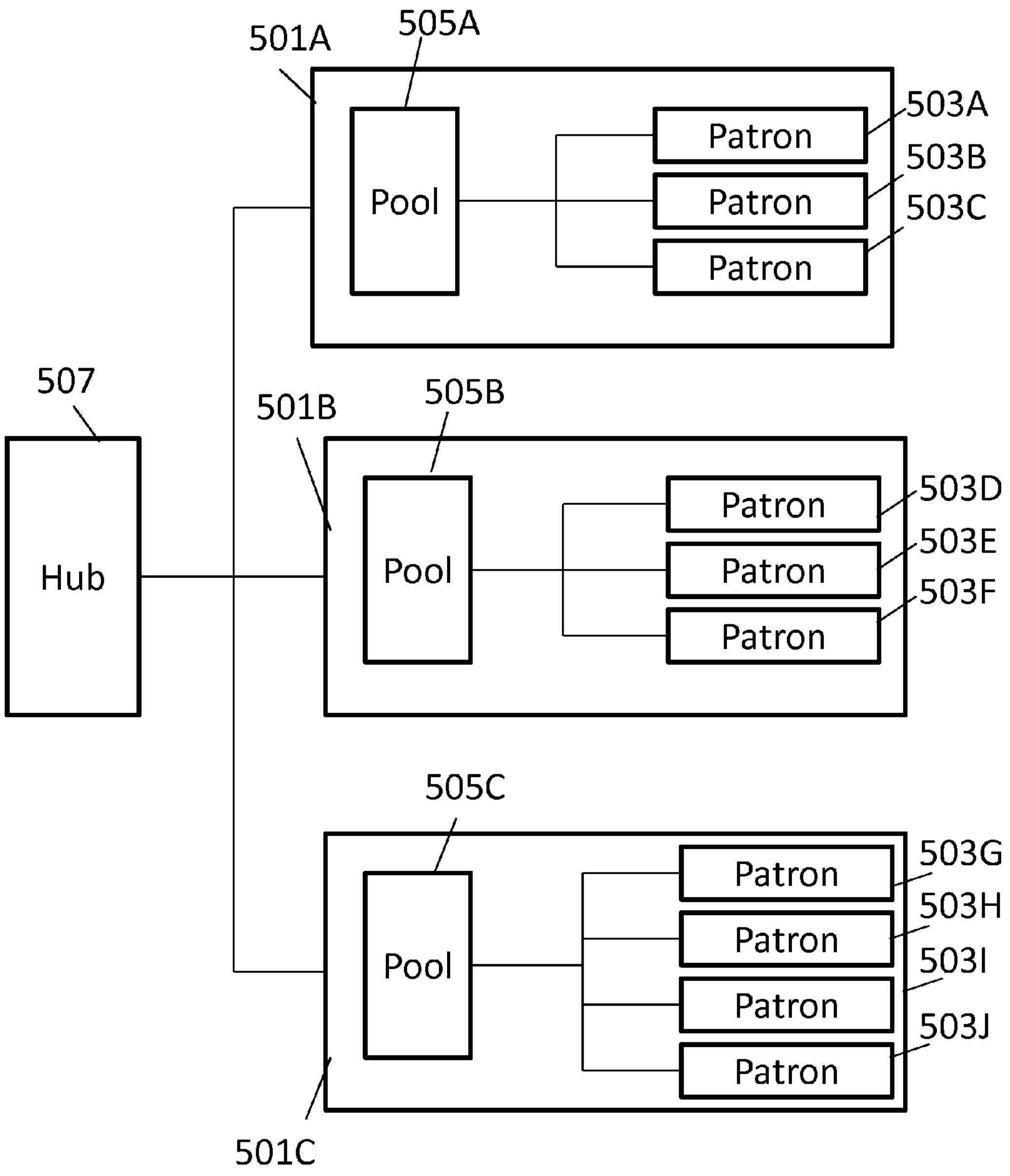
FIG. 5 shows an example system according to some embodiments.

FIG. 5 illustrates an example embodiment that includes multiple gaming operators. Such an embodiment may be used to play a tournament such as that described above, play single player games, play multiplayer games, allow creation and/or searching for tables across gaming operators, and so on as desired. It should be recognized that one or more gaming operators may include, for example, a casino, a mobile gaming provider, a sports book, a cell phone provider, a gaming application provider, a cloud computing operator, and/or any desired entity that may provide one or more gaming services as desired.

FIG. 5 illustrates three example gaming operators, each identified as 501. In some embodiments, a gaming operator may be associated with a property, such as a casino property. One or more players on a property may play games associated with the property. For example, one or more players in a casino may be associated with game play provided by the casino when they are located at the casino. In some embodiments, a gaming operator may be associated with an account, such as a wagering account in which credits and/or money may be stored. One or more players that have an account with a gaming operator may play games associated with the account. For example, one or more players that have an account with a gaming operator may be associated with game play provided by the gaming operator when they use the account. In some embodiments, a gaming operator may be associated with a piece of equipment, such as an access point and/or a gaming device. One or more players that access a network through an access point and/or with a type of device may play games associated with the gaming provider. For example, one or more players that access a particular cell network, Wi-Fi network, use a particular brand of smart phone, run a particular gaming application, etc. may be associated with game play provided by the gaming operator. It should be recognized that various examples of gaming operators are given as non-limiting examples only. Other embodiments may include other types of gaming operators, different gaming operators, more gaming operators, gaming operators that are defined by other characteristics, gaming operators that are defined by a combination of characteristics, and so on.

As mentioned above, one or more players may play games in one or more embodiments. Such player may be in some way associated with one or more gaming operators (e.g., based on location, account, equipment, etc.). FIG. 5 illustrates ten example players 503A-J. Players 503A-C may be associated with a first gaming operator 501A, players 503D-F may be associated with a second gaming operator 501B, and players 503G-J may be associated with a third gaming operator.

Some embodiments may include determining that one or more players are associated with one or more gaming operators. For example, in some embodiments, a gaming operator and/or other entity may determine a location of a player and in response to such a determination, determine that the player is associated with the gaming operator. As another example, a gaming operator and/or other entity may receive an indication of a player playing a game from an account and in response, determine that the player is associated with a gaming operator that maintains the account. As yet another example, a gaming operator and/or other entity may receive an indication of the gaming operator with which the player is associated (e.g., a player may select the gaming operator, from a gaming device used by the player, and so on) and in response determine that the player is associated with the gaming operator. In still another example, a gaming operator and/or other entity may determine that the player is using a particular technology and in response determine that the player is associated with a gaming operator. It should be recognized that any manner of determine that any one or more players are associated with respective one or more gaming operators may be used in any manner in various embodiments.

In some embodiments, a gaming operator may include one or more gaming devices 505. Such a device 505 may facilitate game play for one or more players 503. For example, in some embodiments, such a device 505 may include a server that maintains account information, receives player input, determines game results, adjusts balances, matches players against one another, and so on. In some embodiments, such a device may be part of a peer to peer gaming center, a hub, and/or other entity that provides services to one or more gaming operators.

In some embodiments, a device 505 may allow players to play multiplayer games (e.g., may allow a player to select an offered game, may allow players to form a table, may match players with one another, may maintain tournament levels, may allow a player to make a bet in the selected game, may allow the player to take one or more actions in the selected game, may determine results for the one or more actions in the selected games, may determine an outcome of one or more wagers, may adjust balances of one or more accounts, and so on). Such games may include poker games, black jack games, card games, slot games, table games, video games, board games, singing games, dancing games, action games, role playing games, and so on. Such games may include a head to head game of poker, a many player game of poker, and/or any desired head to head and/or many player game as desired.

In some embodiments, a device 505 may allow players to play single player games (e.g., may allow a player to select an offered game, may allow a player to make a bet in the selected game, may allow the player to take one or more actions in the selected game, may determine results for the one or more actions in the selected games, may determine an outcome of one or more wagers, may adjust balances of one or more accounts, may maintain tournament levels, and so on). Such games may include poker games, black jack games, card games, slot games, table games, video games, board games, singing games, dancing games, action games, role playing games, keno games, bingo games, first person shooting games, and so on.

Some embodiments may include a plurality of players playing a multiplayer game in association with a gaming operator. In some embodiments, for example, player 503A and 503B may play a head to head poker game against one another. It should be recognized that any game with any players in competition and/or cooperation, in teams and/or individually, in a tournament and/or in single player may be used in various embodiments.

Some embodiments may enable a player to search for a game, table, player, and/or wager. Examples of such searching are described herein. In some embodiments, such searching may be facilitated by a device such as a portable device. In some embodiments, such searching may include searching for games, tables, players, and/or wagers that are associated with a particular gaming provider that a searcher is also associated with. For example, a player playing at a particular gaming operator may identify that they desire a search for games of poker with particular characteristics. In some embodiments, a search may be performed (e.g., by a device 505) to find such games that are offered by the gaming operator at which the player is playing. Such a search may include a search for virtual gaming tables that are awaiting one or more players, games that are awaiting one or more players, and so on. Such a search may include a search of games that include one or more players that are also associated with the gaming operator. Such a search may include a search for games that include only player(s) that are associated with the gaming operator. For example, a search may be performed to see if there are any poker games that are populated only by other players at the gaming operator and ready to begin when the player is placed in the poker game.

As discussed herein, some embodiments may include enabling a player to create a game and/or table based on player defined characteristics.

Some embodiments may include presenting a result of a search to a player. Some embodiments may include providing a listing of available games and/or tables to a player. In some embodiments, additional elements may be included in the listing, other listings may be provided, and so on. For example, in some embodiments, a listing may include games available from other gaming providers. In some embodiments, a listing may include an interface through which a player may browse and/or select one or more gaming options (e.g., though an interface of a mobile device). In some embodiments, a adjustment to such a listing may be made such that tables and/or games that are offered by a particular gaming operator and/or that have only players from the gaming operator are listed more prominently than others. For example, games that have only players associated with a gaming operator may be listed ahead of other games and/or larger than other games when listed for a player associated with that same gaming operator. In some embodiments, games may be listed according to a percentage of players being associated with the gaming operator (e.g., the larger the percentage, the more prominent the listing may be). Some embodiments may include determining a prominence of a game for a listing based on such a percentage, a number of players associated with a gaming operator, a source of a game, an agreement to distribute payments for the game (e.g., games for which a higher payment may be given to the gaming operator may be listed with more prominence than other games), and so on.

Some embodiments may include receiving an indication of one or more games and/or tables from a player. A player may use an interface to identify a desire to play a game, select a game, and so on. Such an indication may be received by a device such as 505.

In some embodiments, in response to receiving such an indication, a player may be matched with another player and/or placed in a game or table. For example, a player may be placed in a virtual table that has characteristics identified by a player. As another example, a player may be placed into a queue for a game selected by the player. As another example, a player may be placed in a virtual table selected by the player. As another example, a player may be placed in a game selected by the player. As another example, a plurality of players may be placed in a game or table together (e.g., one or more out of a queue).

Some embodiments may include facilitating play among/between players. Various examples of facilitating play are given herein. For example, players may be allowed to make one or more actions in one or more games involving one or more other players. In some embodiments, one or more results (e.g., outcomes, cards to deal, dice values, and so on) may be determined in one or more games (e.g., in response to one or more actions). Information may be transmitted to and/or form a player based on a determination. One or more action regarding such game play may be taken by a device such as 505.

Some embodiments may include making one or more payments in one or more games and/or related to one or more wagers to one or more players. Such a payment may be made into an account managed by a gaming provider. For example, a payment may include a payment of an amount won by the player (e.g., an amount of a pot in a game of poker). Some embodiments may include reducing an amount of money in an account of a player (e.g., in response to a lost bet). Such actions may be performed by a device such as device 505. For example, a player that wins a bet may be awarded a payout for the bet. A player that wins a hand of poker may be awarded the pot. A player that wins a game of poker may be awarded the value of the opponent's buy in. A player that wins a tournament may be awarded a prize of the tournament.

Some embodiments may include taking one or more payments based on play of one or more games and/or one or more wagers. For example, a casino may take a cut of each pot of poker, a cut of some amount won by a player, an amount wagered in a lost bet, and so on. Any type of money may be taken by a gaming operator based on play as desired. Such money may be used to fund the operation of the gaming operator. In some embodiments, such a cut or percentage may be allocated among a plurality of gaming operators based on players from those gaming operators playing a game.

It should be recognized that while examples may be given in terms of multiple player games, some embodiments may include a single player game. For example, a player may select and/or search for a single player game, may play such a game, may win or lose such a game, and so on.

Some embodiments may enable a player associated with one gaming operator to play a game with a player associated with another gaming operator and/or play a game offered by the other gaming operator. Some embodiments may include a distributed system, a cloud based system, a client server system, a centralized system, a decentralized system, and/or any arrangement of any components to facilitate such actions. For example, FIG. 5 illustrates one example involving a central hub 507.

Some embodiments may include a hub 507 as illustrated in FIG. 5. Hub 507 may include one or more computing devices (e.g., servers, computers, and so on). Hub 507 may facilitate communication among gaming operators, facilitate play of games across gaming operators, facilitate matching and/or searching across gaming operators, facilitate distribution of funds across gaming operators, and/or perform one or more other actions related to gaming activity across gaming operators.

Some embodiments may include receiving an indication related to a game by a hub. Such an indication may include an indication such as a search request, a request to create a table, an action to take in a game, a request to join a game, a request to enter into a queue for a game, a request to be matched against a player, a request to play a game, and so on. A hub may process such an indication in any manner, such as a manner similar to a device 505. A hub may forward such a request to a device such as device 505 for processing such an indication.

As an example, in some embodiments, a device 505A may receive a request to play a game from player 503A. The device 505A may determine that the gaming operator cannot fulfill the request for some reason (e.g., a determination that there are insufficient other players with interest in the game that are also associated with the gaming operator, a determination that the gaming operator does not offer the game to be played through its servers, and so on). In response to such a determination, device 505A may transmit information about such a request to hub 507. The hub may process such a request in any manner.

For example, in some embodiments, the hub may determine whether any of a set of gaming operators may be able to fulfill the request. The hub may forward the request to a gaming operator that is able to fulfill the request. For example, if player 503D also desires to play a game that player 503A desires to play, the hub may forward the request from player 503A to device 505B. Device 505B may facilitate play of the game between the players. Such play of the game may be facilitated through hub 507 and/or through a communication network that both players may access.

As another example, the hub may also receive an indication that player 503D desires to play the game. In response to a determination that player 503A and 503D both desire to play the game, the hub may facilitate play of the game in any manner desired. For example, the hub may communicate with the players, may determine random numbers, may receive input in the game, mat determine outcomes, may present information, may adjust accounts, and so on. In some embodiments, the hub may direct and/or otherwise utilize one or more devices 505 to facilitate one or more actions (e.g., may request an account be adjusted, may request a determination of an outcome, and so on).

It should be recognized that in various embodiments, any number of players associate with any number of gaming operators may be enabled to play together in any arrangement and/or combination and/or play games offered by any gaming operators through a hub or other system or arrangement. In some embodiments, a device 505 may act as a hub. In some embodiments, a device 505 that receives a request from another device 505 may act as a hub. In some embodiments, a hub may act as a device 505. In some embodiments, there may be no hub and/or device 505. In some embodiments, a peer to peer gaming center may act as an authority to facilitate game play. It should be recognized that various embodiments may be distributed among devices in any manner.

Some embodiments may include determining information to provide from a hub. For example, a hub may determine a result of an action taken in a game, may determine that two players should be matched together, may determine a listing of games available for play, may determine a set of virtual tables at which games may be played, and so on. Any desired determinations may be made by a hub and/or other entity in any arrangement and/or in any manner. A determination may include generating such information, receiving such information from another source, and so on as discussed herein and/or elsewhere.

Some embodiments may include providing information from a hub. For example, information about games offered by a first gaming operator may be provided to a player at a second gaming operator and/or to a second gaming operator (e.g., a device 505). Gaming results may be provided from a hub to a player and/or gaming operator. Account information may be provided to a player and/or gaming operator. Any desired information may be provided as desired (e.g., through a communication network, a display, and so on). Account information may be adjusted in response to information determined by a hub and/or other device.

Some embodiments may include facilitating play of a game by a single player, between two players at same or different gaming operators, and/or among any number of players at any number of gaming operators. Facilitating play may include forwarding information, determining gaming results, accepting gaming actions, connecting a player with a server, monitoring play, presenting information, determining outcomes, determining random numbers, adjusting balances, and so on.

Some embodiments may include facilitating an adjustment in one or more gaming accounts and/or facilitating a payment to one or more players. For example, in some embodiments, the hub may adjust an amount of money into wagering account. An amount of money may be increased in response to a winning wager and or decreased in response to a losing wager. Hub may identify to the device 505, to make adjustment for balance in account. The hub may receive information identifying that a balance in an account should be adjusted. The hub may forward on an indication that a balance in the account should be adjusted. It should be recognized that in various embodiments in hub may perform any desired action that may help to bring about an adjustment to an account based on gameplay. In some embodiments, a hub may maintain account information itself.

In some embodiments funds in accounts may become available for use substantially immediately upon being adjusted. In some embodiments funds in accounts may become available for use in response to one or more actions being performed. For example a fund maintained by first gaming operator may be associated with funds that do not become immediately available for use in response to receiving an instruction to adjust the funds in the account from the hub. Rather, the gaming operator may perform an audit and/or await a verification that the funds are available before the funds become available for use. For example, a bank account and or other source of funds may be verified by the gaming operator before the funds become available for use. As another example, the gaming operator may review a set of actions and or outcomes of one or more games related to an adjustment in the account to verify that the adjustment in the account is accurate. The gaming operator may receive a record of game events from a hub, device 505, gaming operator, and/or other device for review. According to various embodiments.

In some by embodiments, compensation for gameplay may be allocated to one or more gaming operators. In some embodiments, one or more gaming operators may receive a portion of wagers, winnings, losses, entry fees, and/or any other possible source of revenue. Such compensation may be a source of revenue for the gaming operator. For example, in some embodiments, when a player plays a game associated with a first gaming operator and loses a wager in the game (e.g., loses a single player game of blackjack played against the gaming operator), the first gaming operator may be allocated at least a portion of the amount wagered by player in play of the game. As another example, if two players associated with a first gaming operator play a head to head game against one another (e.g., a head to head poker game), the first gaming operator may be allocated at least a portion of a buy-in, an amount won, an amount lost, a fee paid to play the game, and/or any other amount (e.g., a rake, an entry fee, a counter party risk acceptance). In some embodiments, a gaming operator and/or hub responsible for gameplay may be responsible for allocating, managing, taking, and/or any other actions related to taking a cut. In some embodiments, any entity may be responsible for such actions.

In some embodiments, compensation may be allocated to a plurality of gaming operators involved in, and/or with gameplay of a game. For example, if a multiplayer game is played with a first player associated with a first gaming operator and a second player associate with a second gaming operator. Compensation may be allocated to one and/or both of the first and/or second gaming operators. In some embodiments, a hub, gaming operator, and/or other device may distribute and/or allocate compensation for such gameplay to the gaming operators. For example, the hub may determine that each gaming operator in a game is associated with an equal number of players in the game. In response to such determination, an allocation of an equal or unequal share of compensation to each of the gaming operators may be made. In some environments, a share of compensation may be distributed based on a number of players associated with the gaming operator. In some embodiments a share of compensation may be allocated based on an agreement between gaming operators. In some embodiments a share of compensation may be allocated based on a gaming operator, performing one or more actions related to a game (e.g., such as a gaming operator determining outcomes for the game, winners of the game, and so on).

In some embodiments, a payment from a gaming operator may be made. For example, an amount one by player for player of one or more games would be paid to the player. For example if a player wins a wager in a game player and paid a winning amount. For example, if a player plays a game and wins a jackpot in the game. A gaming operator may pay the player jackpot amount. The amount may be paid by a gaming operator associated with the player. For example, if a player is playing a single player game associate with the first gaming operator. The player may be paid by the first gaming operator. A payment may be made in whole or part by one or more gaming operators as desired in any combination based on players playing the game. The portion paid by each of the first and second gaming operator may be based on actions performed by each of the first and second gaming operator, and/or an agreement between the gaming operators. The hub or other element may determine the allocation of the payment among gaming operators. The payment may be made by a gaming operator associated with the player, associated with performing one or more actions to facilitate play the game, associated with an opponent of the player, and so on.

It should be recognized that any allocation of any set of funds being due to and/or from a gaming operator may be allocated based on any set of criteria. Such allocation may be performed by any entity such as the hub device 505, a gaming operator, and so on.

In some embodiments a gaming operator, a hub, and or any other entity may receive and/or provide material so that another gaming operator may audit a series of transactions that may result in a payment being made to and/or made from the gaming operator. For example, if a first gaming operator determines that a payment to a second gaming operator and/or to a player associate with either the first or second gaming operator is to be made, the first gaming operator may provide the second gaming operator with information identifying one or more occurrences that results in the payment being due. In some embodiments, the first gaming operator may make the payment on behalf of the second gaming operator, and submit a request for repayment. The second gaming operator may determine that the request is valid by processing audit information and provide the first gaming operator with repayment and/or make a payment to the player. It should be recognized that any manner of requesting payments, requesting repayments, making payments, making payments on behalf of another, auditing payments, auditing requests for payments, and so on, may be performed as desired in various embodiments.

Because compensation and/or payments may be treated differently and may be more complicated when multiple gaming operators are involved in play of a game, an interface that provides information about available games, and/or a computer system that matches players for games may treat possible games involving a single gaming operator differently than, possible games involving a plurality of gaming operators. For example, a preference may be given to games that involve a single gaming operator over games involve a plurality of gaming operators. Games that involve a single gaming operator for example may be listed in a listing ahead of games that involve a plurality of gaming operators. Games that involve a single gaming operator for example, may be shown in an interface as larger than games that involve a plurality of gaming operators. Games that involve a single gaming operator, for example, may be shown in interface even if the games do not match a gaming request. Such games may be shown in interfaces along with games that involve a plurality of gaming providers that do match the gaming request. In some embodiments, games that involve a plurality of gaming providers may be hidden (e.g., a special request may be needed to access such games, may not be displayed in some interfaces, may be displayed only in response to a search, and so on).

Figure 6:
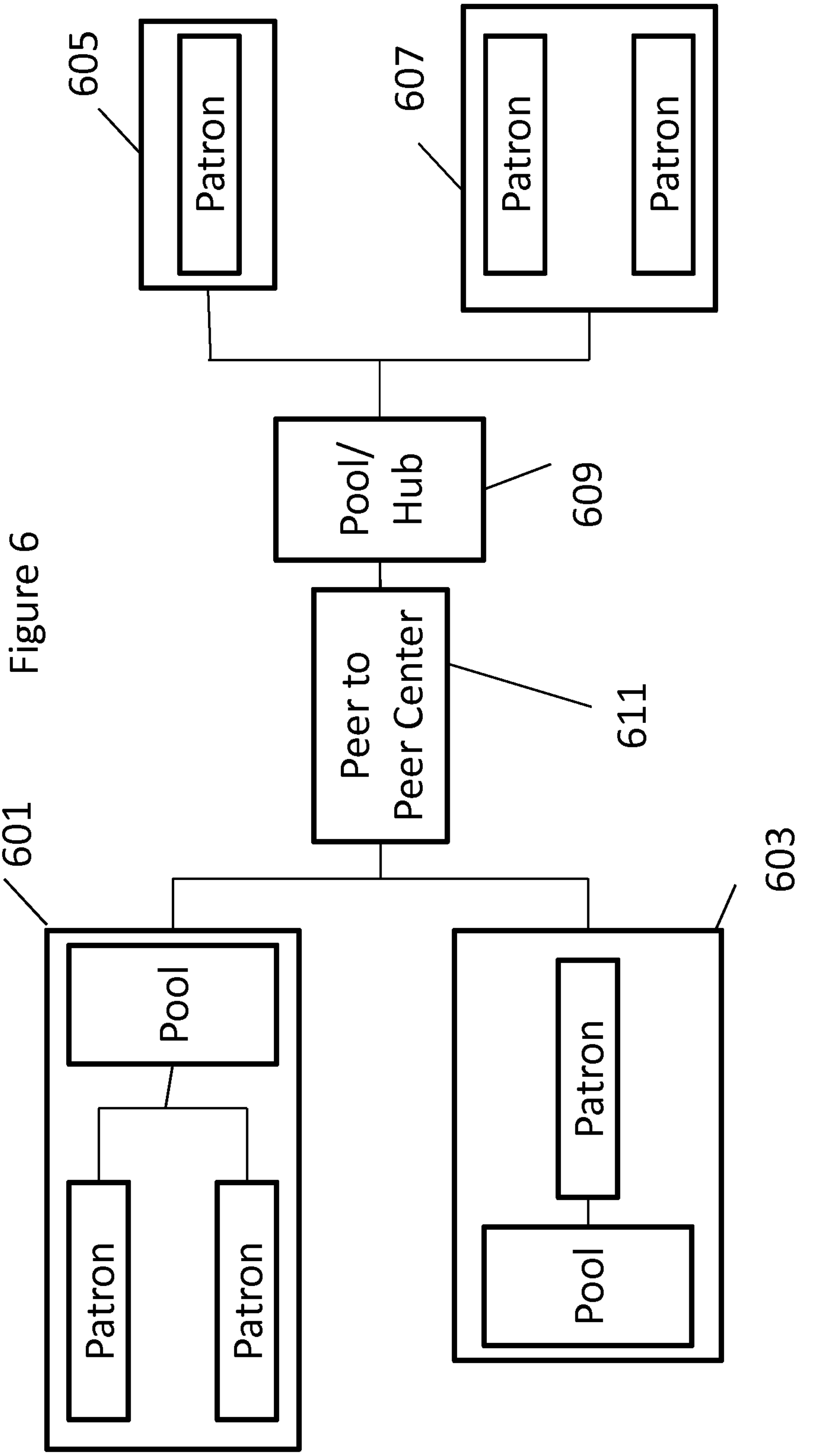
FIG. 6 shows an example system according to some embodiments.

FIG. 6 illustrates another embodiment. In the embodiment of FIG. 6, a first and second gaming operator 601 and 603 are associated with separate pools and separate patrons similar to the gaming operators of FIG. 5.

Gaming operators 605 and 607 may include casinos or other gaming operators. Such gaming operators may include operators with a relationship, such as different properties of a same gaming operator. These gaming operators may share a single pool and/or hub 609 as illustrated in FIG. 6. For example, patrons at gaming operators 605 and 607 may be treated as if they are at a single gaming operator for at least some purposes (e.g., money allocation, etc.). For other purposes (e.g., regulatory reasons) they may still be treated differently.

Some embodiments may include a peer to peer gaming center 611 (and/or single player gaming center that may be a same or different element as desired). Peer to peer gaming center may provide functionality to allow play of games by patrons. For example, peer to peer gaming center may determine random numbers, determine results, receive indication of actions in games, transmit information for display on devices, and so on. Peer to peer gaming center may act as a server in a client server gaming model. Peer to peer center may act to match players together, audit actions, allocate funds, and so on such as a hub in FIG. 5.

As one example based on FIG. 6, the two patrons at gaming operator 601 may be matched together (payment allocations may be to/from operator 601), a patron at gaming operator 605 and a patron at gaming operator 607 may be matched together (payment allocations may be to/from operators 605 and 607, which may be a same operator with multiple locations), and the second patron at gaming operator 607 may be matched with the patron at gaming operator 603 (payment allocations may be to/from gaming operator 603 and 607, which may be the same operator as 605 but a different location). It should be recognized that in other embodiments, other matching may occur.

It should be recognized that any arrangement of elements may be used in various embodiments. For example, in some embodiments, a tier of hubs and/or pools may be used. For example, a first set of gaming operators may enter into a first level of a tier of a hub which may attempt to match players in that particular set of gaming operators before moving to a next level of a set of hubs. At a next level, gaming operators from outside that set of gaming operators may be included. Any number of such levels may be used as desired.

It should be recognized that various actions may be performed by any desired element. For example, allocation, matching of players, gaming server functions, auditing, and so on may be performed in part and/or in whole by a peer to peer center, a hub, a gaming operator, and/or by another entity. In some embodiments, part of such actions may be performed by one entity and another part by a different entity. In some embodiments, some such actions may be performed by one entity in some circumstances (e.g., when all players are at a single gaming operator) but another entity in other circumstances (e.g., when players are matched against players at different gaming operators).

Figure 7:
FIG. 7 shows an example method according to some embodiments.

FIG. 7 illustrates an example method that may be performed in some embodiments. Such a method may be performed in whole or in part by one or more element of a gaming operation, such as a gaming operator, a hub, a peer to peer center, a server, a client device, and so on.

Some embodiments may include determining that a first player and a second player associated with a first gaming operator both desire to play a first game. Such a determination may be made in response to receiving a request to play such a game from each of the first and second player. Such a request may identify the gaming operator. In some embodiments, the gaming operator may be determined based on a location from which the request is made, an account from which the request is made, and/or a recipient of the request (e.g., the gaming operator may receive the request).

In some embodiments, in response to a determination that a first player desires to play the game, a presentation may be made to the second player that the first game is available for play. For example, a listing of games may include the first game at a level higher than other games, identify that the first game may be played now, and so on as desired.

In some embodiments, a determination that any number of other players at any number of other gaming operators (e.g., a second gaming operator) may be made.

Some embodiments may include matching the first and second player against each other to play the first game in response to the determination that the first player and the second player desire to play the first game. For example, the first and second player may be placed at a virtual poker table to play a game of head to head poker through mobile devices. Such a matching may occur even though any number of other players at any number of other gaming operators may desire to start play.

Some embodiments may include facilitating play of the first game between the first and second player. For example, various outcomes may be determined, various actions may be selected, various information may be displayed, matching of players may be part of facilitating, placing players at a virtual table may be part of facilitating, an action that may aid in allowing ht players to play against each other may be taken, and so on. In some embodiments, such facilitation may be performed by a gaming server (e.g., one operated by a gaming operator, a peer to peer gaming center, and so on).

Some embodiments may include allocating a payment to the first gaming operator based on the first and second player being associated to the first gaming operator in response to facilitating play of the first game. A first percentage based of an amount wagered, an amount lost, an amount won, an amount bought into at the virtual table, and so on may be allocated to the first gaming operator as a payment for providing gaming services to the first and second player. The percentage allocated may be based on a number of players that are associated with the first gaming operator that play the first game. In some embodiments, an amount owed to a player and/or lost by a player may be allocated to the first gaming operator based on the player being associated with the first gaming operator.

Some embodiments may include determining that no player associated with the first gaming operator desires to start play of the first game. For example, the first game may include a head to head poker game and there may be a first set of players (e.g., the first player and the second player) playing the game, but no other players that desire to play the game. In some embodiments, a player may play the first game but also desire to enter into another instance of the first game. In other embodiments, a player may only be allowed to play a single instance of the first game.

In some embodiments, in response to such a determination, an indication of games available for play may be altered. For example, the first game may be listed less prominently than other games (e.g., at a lower location, with a smaller amount of screen space, display of the game may be altered to indicate that there may be a wait to play, and so on). Such an indication may include an indication associated with the first gaming operator (e.g., an indication made to patrons of the first gaming operator).

Some embodiments may include determining that a third player associated with the first gaming operator desires to start play of the first game. Such a determination may be similar and/or different from a determination that any other player desires to play the first game.

Some embodiment may include a determination that no player that is associated with the first gaming operator other than the third player desires to start play of the first game. Other players associated with the first gaming operator may be playing the first game in some embodiments.

Some embodiments may include altering an indication of games that are available to play in response to a determination that a player desires to start play of the first game. For example, a listing of available games may be changed such that the first game is listed in a more prominent fashion (e.g. than it previously was, at a higher location, with a larger display, with an indication that another player is ready to play, and so on).

Some embodiments may include waiting an amount of time. Such an amount of time may include a predetermined amount of time, a random amount of time, a time chosen by the first gaming operator, and so on). Such time may include a time that the first gaming operator waits in hope that another player associated with the first gaming operator may also indicate a desire to play the first game. Such a time may include one minute, thirty minutes, five seconds, one day, and/or any amount of time. In some embodiments, if another player associated with the first gaming operator is determined to also desire to play the first game, the two players may be matched together, play of the game may be facilitated between the two players, and funds may be allocated to the first gaming operator such as in the first and second player examples.

In some embodiments, after such a period of time, a player may be found associated with another gamin operator for play of the first game with the third player. Some embodiments may not include such a time. In some embodiments, the first gaming operator may communicate with one or more other gaming operators, hubs, gaming servers, peer to peer centers, and so on regarding such possible other players and/or any actions may be performed by such entities (e.g., a peer to per gaming center may perform all actions of a method such as that of FIG. 7 so that no such additional communication may be needed).

Some embodiments may include determining that a fourth player associated with a second gaming operator desires to play the first game. Such a determination may include receiving an indication of such a desire from the fourth player. A peer to peer gaming center, gaming operator, hub, server, and so on may make such a determination.

Some embodiments may include determining that no other player at the second gaming operator desires to start play of the first game.

Some embodiments may include matching the third and fourth player to play the first game in response to determining that both players desire to play the first game. In some embodiments, such a matching may take place in response to a determination that no other players at either the first or second gaming operators desires to start play of the first game. In some embodiments, such a matching may occur in response to a time passing and/or other requirements being fulfilled. In some embodiments, such a matching may take place based on a matching of characteristics related to the first game (e.g., the first game may include a poker game and the characteristics may include a bet minimum). Such matching may include placing each of the players at a virtual gaming environment where they may play a game with/against one another.

Some embodiments may include facilitating play of the first game by the third and fourth players. For example, various outcomes may be determined, various actions may be selected, various information may be displayed, matching of players may be part of facilitating, placing players at a virtual table may be part of facilitating, an action that may aid in allowing ht players to play against each other may be taken, and so on.

Some embodiments may include allocating a payment to each of the first and second gaming operator based on the third player being associated with the first gaming operator and the fourth player being associated with the second gaming operator. A respective percentage based of an amount wagered, an amount lost, an amount won, an amount bought into at the virtual table, and so on may be allocated to each of the first and second gaming operators. The sum of the percentages may equal the first percentage and/or be different from the first percentage. Each gaming operator may have a same percentage allocated. A different percentage may be allocated to each gaming operator. A percentage allocated to each gaming operator may be based on actions by a player associated with the gaming operator (e.g., bets made by a player, amount lost by the player, amount won by the player, and so on). For example, a larger or smaller amount may be allocate to a gaming operator that is associated with a player that makes larger bets, losses more money, wins more money, buys more chips, and so on. In some embodiments, a percentage may be associated with a amount of players associated with a gaming operator that play the first game, that play a particular instance of the first game (e.g., if it is a three player game and 2 out of 3 players are associated with the first gaming operator, ⅔ of the first percentage may be allocated to the first gaming operator), and so on. It should be recognized that any payment may be allocated among gaming operators in any manner based on players of a game being associated with the gaming operators.

In some embodiments, an amount owed to a player and/or lost by a player may be allocated to the first and second gaming operators based on the player third and fourth player being associated with the first and second gaming operator. It should be recognized that allocation of payments, losses, and so on due to and/or from a gaming operator and/or player may be allocated among any number of gaming operators based on the gaming operators performing one or more actions, supplying one or more players, and so on to play a game.

In some embodiments, a tax withholding may be made from one or more players. For example, different jurisdictions may have different withholding rules. A system and/or gaming operator may withhold taxes and/or make reportings regarding taxes that may be required in a relevant jurisdiction. In some embodiments, different players in a same game may be from different jurisdictions and/or participate through gaming operators that are in different jurisdictions. Accordingly, different withholding and/or reporting rules may apply to players in a single game and/or tournament. Based on jurisdiction, a gaming operator and/or some intermediary system facilitating one or more functions described herein may facilitate a withholding and/or reporting required for one or more (e.g., each player) according to the rules of the jurisdiction of the player and/or gaming operator through which the player plays the game. In action, some embodiments may withhold different amounts for different players in a single game even if those players win and/or lose the same amounts of money because they play the game from jurisdictions that require different withholdings. Some embodiments may apply a standard withholding and/or reporting rule based on where the game is hosted (e.g., at a hosting gaming operator that may be considered to be where the money is earned and/or lost by a revenue service).

It should be recognized that FIG. 7 is given as an example only and that other methods may include differently orders, additional, fewer, same, different, and soon actions as desired. It should be recognized that while the example method is given in terms of a two player game, other embodiments may include any number of players and any number of gaming operators in any combination (e.g., a single player and multiple operators, three players and three operators, etc.). It should be recognized that even though matching examples are given in terms of a game, some embodiments may include matching based on any desired characteristics (e.g., a two players associated with a single gaming operator that want to play a same game may not be matched because of other desired characteristics of the game not matching and instead the players may be matched with other players at other gaming operators that desire to play games with same and/or similar characteristics). Such characteristics may include minimum bet amounts, buy in amounts, maximum bet amounts, number of rounds of play, duration of play, rule variations, and so on as desired.

In some embodiments, using a system and/or method that allows a matching of players at among gaming operators may provide a larger pool of liquidity and/or players to play the game. This may result in a larger amount of play and/or earnings by the set of gaming operators taken together. In some embodiments, matching players at a tier and allowing allocation to track such matching may allow gaming operators to keep earnings by players associated just with their operation rather than sharing the earnings with other gaming operators. In some embodiments, the combination of allowing players form multiple gaming operators to play against one another and a allocation that preferences players at a single gaming operator may benefit each gaming operator by allowing them to retain a revenue stream similar to that which they would have without other gaming operators being involved and augment that revenue stream by allowing play even when play might not be available otherwise.

Some embodiments may include a progressive payout and/or one or more other jackpots. Such payouts may be related to events occurring in one or more games. In some embodiments, a progressive jackpot may be paid at the end of a tournament and/or in response to some event occurring (e.g., a royal flush, a bad beat, etc.). Funding from such a jackpot and/or payment of such a jackpot may be divided among any number of gaming operators as desired. For example, in some embodiments, an amount of money from each play (e.g., from one, multiple, all gamin operators) may be assigned to the progressive jackpot and the winner may be allocated with progressive jackpot. In some embodiments, such jackpots may be associated with a single gaming operator (e.g., the gaming operator at which the player is associated) and/or all gaming operators (e.g., all gaming operators that offer play of the game).

Some embodiments may include a bad beat jackpot. Such a jackpot may be provided to a player that losses a game in some circumstances. For example, such a jackpot may be provided if a player is expected to win a game but loses a game. For example, such a jackpot may be provided if a player has a hand in poker over a certain rank but still loses the game. For example, such a jackpot may be provided if a player based on their hand in a game has an expected chance of winning over a threshold but losses.

A jackpot or other payment may be associated with play at a particular gaming operator. For example, a first gaming operator may offer a bad beat jackpot, a progressive jackpot and/or any jackpot that may be offered only to players associated with the first gaming operator. Such a jackpot may be offered only to those players even though those players may be able to play against players associated with other gaming operators. Other gaming operators may offer other jackpots (e.g., with different triggering events, with different funding pools, and so on).

Some embodiments may include a tournament of game play across multiple gaming operators. In some embodiments, such a tournament may similarly to other embodiments give some level of preference to matching players at a single gamin operator. For example, if players in a particular tournament tier are available at a single gaming operator, such a match may be given preference to a match across different gaming operators.

Some embodiments may include points and/or complementary goods. Such goods and/or point may be provided to one or more players (e.g., based on play of one or more games). In some embodiments, funding for such provision may be based on a gaming operator to which a player is associated. In some embodiments, funding for such provision may be split among gaming operators associated with a game being played that earns such provision. Such complementary goods and/or points may include elements that may be used to pay for things and/or place wagers (e.g., pay for a room, buy a drink, enter into a wager in another game, etc.).

It should be recognized that while some embodiments are described in terms of multiple gaming operators, that some embodiments may include a single gaming operator. It should be recognized that some embodiments may include multiple jurisdictions in addition to and/or as an alternative to multiple gaming operators. For example, in some embodiments, a single gaming operator may provide operations in multiple jurisdictions (e.g., states, countries, cities, counties). Such a gaming operator may have to pay different taxes, shares of revenues, follow differ regulations, and so on based on the different jurisdictions. Accordingly, game matching, game play, indicating available games and so on may be favored as paired within a same jurisdiction before matching across jurisdictions in a manner similar to and/or different than those described herein with regard to some multiple gaming operator embodiments.

Some embodiments may include both multiple jurisdictions and multiple gaming operators. In some embodiments, a level of preference may be tiered, as discussed herein. For example, first matching may be preferred at the gaming operator level and second matching may be preferred at a jurisdictional level. Matching, display preference, and/or any desired elements may be used to facilitate such a preference.

In some embodiments, gaming operators may include multiple levels of granularity (e.g., a same property, a same parent company, an affiliate of a same company, and so on) such that preference among gaming operators may be more than a binary preference and/or may include any number of preference levels. In some embodiments, jurisdictions may include any level of granularity, such as city, county, state, country, and so on so that a preference among jurisdictional matching may be more than binary and/or may include any level of granularity.

It should be recognized that gaming operator preference and/or jurisdictional preference may act together in any level of granularity and in any order or combination of preference. For example, some jurisdictional preferences may outweigh some gaming operator preference and some gaming operator preferences may outweigh some jurisdictional preferences. Some embodiments may include determining such a preference hierarchy based on a desire of one or more gaming operators, regulators, system operators, and so on. Some embodiments may include matching players, presenting information and so on in accordance with such a hierarchy.

Figure 8:
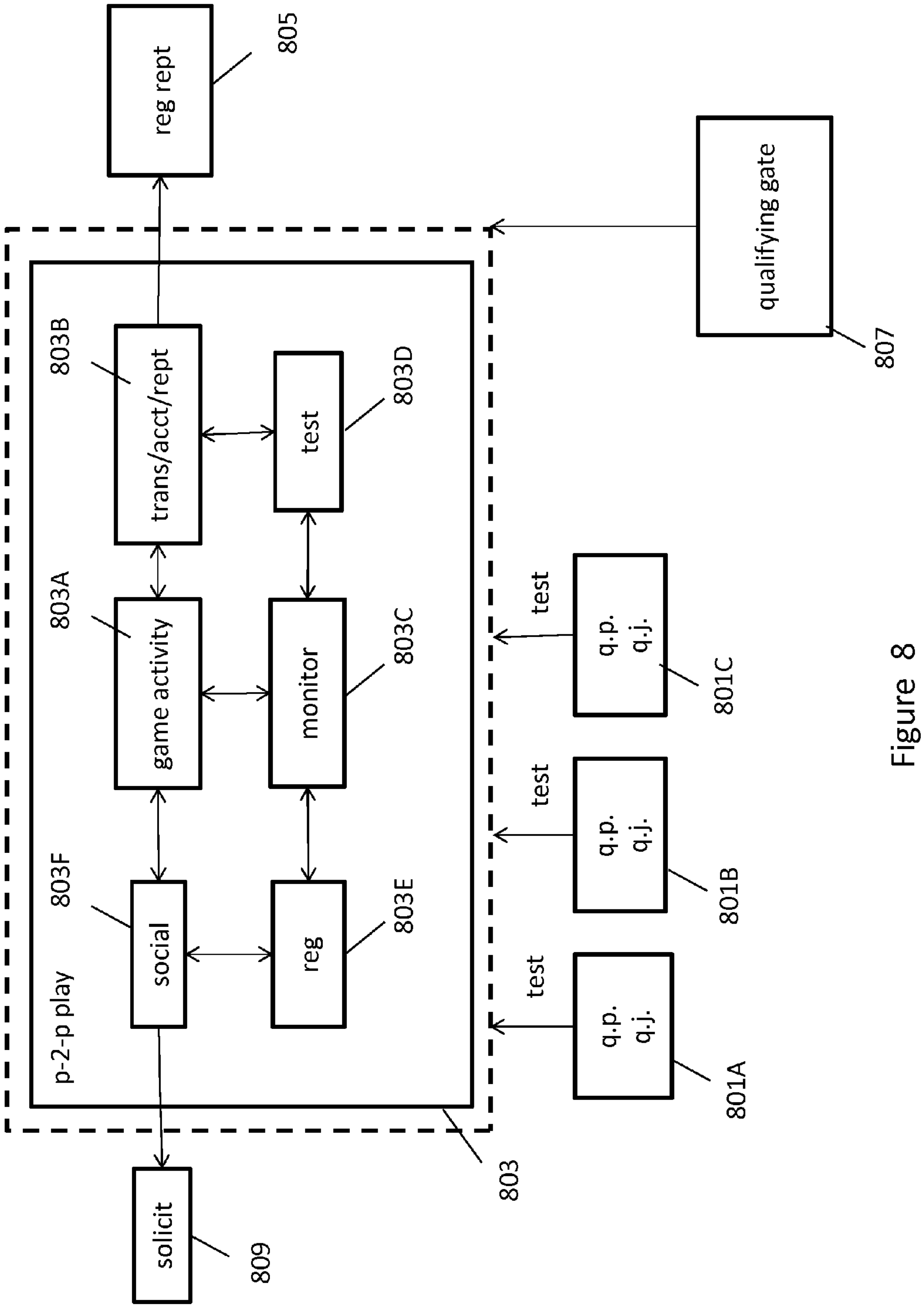
FIG. 8 show an example logical diagram according to some embodiments.

FIG. 8 illustrates a logical structure that may be used in some embodiments to provide gaming functionality to one or more players. In some embodiments, such a diagram may describe the functionality of a gaming server, a hub, a peer to peer gaming center, a gaming operator, and/or any element that may facilitate gaming.

Some embodiments may include a plurality of players 801 A-C. Such players may play associated with a single and/or multiple gaming operators and/or in a single and/or multiple jurisdictions in any combination or arrangement and/or matched together to play games with one another. Various functionality that may relate to facilitating play among multiple jurisdictions and/or gaming operators is described herein. Such players may play from one or more devices, such as a mobile device, a smart phone, a computer, a tablet, a laptop, a kiosk, an augmented reality device, and/or in person. Various embodiments may include formatting and/or controlling such devices to properly provide information to a player (e.g., formatted to a display screen, using a communication technology that is understood by the device, and so on).

Some embodiments may include a gaming element 803. A gaming element may provide various functionality to allow players to perform gaming related activities. A gaming element may include one or more servers, one or more processors, one or more cloud computing modules, one or more blades, and/or any desired elements arranged in any manner to provide gaming functionality. Such a gaming element may include a plurality of modules that may provide various elements of functionality. Such modules may include blades, processors, servers, cloud computing elements, program elements, and/or any elements combined together through a bus, a network, and/or any manner. FIG. 8 illustrates some example modules, but it should be understood that such modules are given as an example only and that other embodiments may include fewer, a single, additional, alternative, none, more, etc. modules in any arrangement and/or combination. For example, some embodiments, any of such illustrated modules may be eliminated, combined with another module, and/or separated into multiple modules. Such module may be coupled together and/or share information through one or more communication networks and/or memory modules in any manner.

A gaming element may include a gaming activity module 803A. The gaming activity module may determine outcomes for various games, receive actions from various players, determine results of actions in various games, determine wager results, determine information to send to players to facilitate a game (e.g., in response to players transmitting information to and/or receiving information by a gaming activity module), present available games to a player, match players together in multiplayer games, and so on. In some embodiments, such a module may maintain and/or adjust account balances and/or work with another module to perform such functionality. Such a module may have primary responsibility for game play determinations in some embodiments.

A gaming element may include a reporting module 803B. Such a reporting module may provide accounting, transaction, and/or regulatory functionality. For example, in some embodiments, such a module may adjust account balances of one or more player accounts based on gaming activity performed using a game activity module 803A, based on one or more deposits made by a player, and so on. In some embodiments, such a mobile 803B may maintain accounting records for an account, maintain balances for an account, provide information about an account to one or more players, and so on. In some embodiments, such a mobile may perform one or more reporting actions to report account and/or gaming activity related to an account to one or more regulators and/or players. For example, in various jurisdictions that allow legal gaming, a regulatory body may require reports regarding gaming activity that leads to gaming wins and/or gaming loses and/or relates to money in a gaming account. Such reports may be generated and/or transmitted by a module 803B to a regulator as indicated by report 805. In some embodiments, such a report may also be desired and/or transmitted to a gaming operator (e.g., in an embodiment in which multiple gaming operators provide games through such a system so that proper revenue distributions may be audited). Any element of game activity and/or account activity may be monitored, audited, recorded, reported, accessed, and so on as desired by a regulator, a gaming operator, and/or a player as desired using a module such as 803B. In some embodiments, another module may provide desired information to generate any report. For example, an account module may provide accounting information for accounting reports, a regulatory and/or monitoring module may provide game activity information for gaming regulator reports and/or tax reports, a social module may provide relationship and/or reports of information shared to generate privacy reports, and so on.

Some embodiments may include a monitoring element 803C. Such a monitoring module may monitor gaming activity performed by one or more players and/or facilitated by gaming activity module 803A. For example, such a monitoring module may receive information identifying outcomes, actions, wins, losses, wagers, and so on. Such information may be used to audit one or more games by a gaming operator, by a regulator, to determine whether users are cheating, to determine if games are operating in a fair manner, and so on. A monitoring module may store, format, record, transmit, provide access to and so on monitored information in any manner desired. For example, such information may be provided to a regulating module 803B such that it may be reported to a remote location (e.g., a gaming regulator, a player in a form of a game history, a gaming operator for auditing purposes, etc.).

Some embodiments may include a testing module 803D. Such a testing module may perform one or more qualifying checks on a user. For example, such a testing module may prompt a user for a username and/or password, determine if a user is running approved software, determine if a user is using an approved device, determine if a user is accessing an approved account, determine if a user is in an approved location for play of a game, determine if a user is of an appropriate age, and/or perform one or more tests upon a user to determine a user's eligibility to use a system and/or play one or more games. In some embodiments, a qualifying gate 807 may be used to facilitate one or more tests. For example, such a gate may include an internet gateway that may limit access to the system unless a user passes one or more tests. Such a gate may include one or more external elements that may aid in determining whether a test is passed (e.g., a GPS system that may provide location information, a cellular service that may provide subscriber information, and so on). In some embodiments, a testing module may apply additional, fewer, different, and so on tests as a qualifying gateway (e.g., a testing module may perform periodic checks of one or more tests, may perform updated checks in response to a request to wager, and so on). A testing module may share testing data with one or more regulatory and/or auditing modules so that an audit of user activity may include information that identifies the qualifications of the user to play a game. In some embodiments, different jurisdictions may include different testing rules and such a testing module may ensure that such rules are followed even as a user moves from one jurisdiction to another jurisdiction. For example, in some jurisdictions a test of a location may be required more often than in others and/or may allow different technologies (e.g., GPS in one jurisdiction, geofencing in another jurisdiction).

Some embodiments may include one or more regulatory modules 803E. Such a module may be part of a reporting module. Such a module may be configured to determine regulatory rules that may be required to be followed for one or more jurisdictions. For example, some jurisdictions may have different regulatory rules, and such a module may manage the different rules such that players in multiple jurisdictions may use the system to play games (e.g., alone or against player in the same or different jurisdictions). Such a module may adjust functionality of other modules based on jurisdictions of players and/or rules of jurisdictions. Such a module may record the required information based on the jurisdiction of players playing a game. Such a module may adjust wagers, and/or other operation of a game based on jurisdictional rules.

For example, the United States and/or other countries may allow one or more types of wagering (e.g., electronic poker, horse racing, sports wagering, casino games). Such countries may allow different types of wagering and/or regulate the types of wagering differently. Similarly, different states, cities, counties, and so on may choose to allow some such wagering and/or regulate such wagering differently, In some embodiments, such a module may ensure that various such regulations are met (e.g., by preventing and/or adjusting play based on location information identifying where those people are playing)

For example some justifications may only allow a player in that jurisdiction to play against other players in that jurisdiction or against players in a limited set of other jurisdictions and such a module may ensure that such a regulation is not broken by adjusting one or more matching rules and/or record information regarding game play so that jurisdiction information may be reported.

As another example, some jurisdictions may include maximum and/or minimum wager requirements. Such a module may adjust game play to correspond with such requirements and/or record game play so that proper reports may be made to prove that game play followed such rules.

As another example, some jurisdictions may include one or more display or game play requirements (e.g., a warning must be displayed, a break must be taken every X minutes, a account balance must be a certain size, only certain games may be played, account management requirements, maximum loss per hour requirements, and so on). Such a module may adjust operation of one or more other modules in response to such requirements such that players in each jurisdiction have play that corresponds to such requirements and/or may record actions in one or more games to prove that such requirements have been followed. For example, in some embodiments, a game being played may be adjusted so that only certain wagers are available based on a determination that one or more players of the game is in a jurisdiction that does not allow one or more normally offered wagers in the game. As another example, one or more games may be removed from a game selection interface based on such a game not being allowed to be played in a particular jurisdiction associated with a player accessing the interface. It should be recognized that any element of game play functionality may be adjusted in any manner to comply with one or more jurisdictional rules for one or more players of a single or multi player game and that given examples are non limiting. Such adjustment may be made such that all players of a game are from a jurisdiction that allows a particular game (e.g., only allow players to join a game if their jurisdiction allows all elements of the game), such that the game complies with the jurisdictional rules of all players of a game (adjust the game for all players or at least some players such that each player complies with their own jurisdiction's rules), and in any other desired manner.

In some embodiments, periodic, real time, on demand, and so on monitoring and/.or adjustment of games and/or allowed activity may be performed by such a module. For example, a player that crosses a border from one jurisdiction to another jurisdiction while playing a game may have play of the game adjusted and/or stopped based on a change in rules of the two different jurisdictions. And or reporting and/or monitoring may be adjusted based on such a change of jurisdiction. In some embodiments, near a border between such jurisdictions, both jurisdictions monitoring and/or reporting rules may be followed, and/or a report may be made to both such jurisdictions.

Some embodiments may include a social module 803F. Such a module may provide any desired social functionality to one or more users as desired and/or allowed based on jurisdictional rules. For example, a social module may track friends lists, track preferred and/or past opponents, allow players to chat with one another, allow players to form social networks, allow players to invite "friends" to play games, notify "friends" of gaming accomplishments of one another, notify "friends" of availability of one another to play one or more games, suggest "friends" to people, allow people to monitor or follow other people, allow users to share information with one another, and so on. In some embodiments, such a system may interface with one or more other social elements, such as a social network service, an email service, and so on. For example, such a service may import contact and/or "friend" information form a social network service like facebook and/or Google+ and provide gaming related social services on top of such traditional social networking services.

In some embodiments, game activity of one or more players may be shared with one or more other player's based on a social connection between the players. For example, members of a player's social network may be notified of the player's wins and losses in a game, amounts of money won or lost over a period of time, progressive award wins, near misses to win a jackpot (e.g., a bad beat), rare outcomes accomplished (e.g., a royal flush being dealt), and so on.

In some embodiments, a player may establish a link to one or more players and/or player types. A player may receive notifications regarding such a player. For example, a player may desire to be notified if a set of players (e.g., if any member of a set of players that the player has previously player with, if any of their friends, and so on) begin playing a particular game and/or any game. A player may desire to be notified if a player with a particular account balance, win/loss record, average bet size, number of hours played, and/or other characteristic begins to play. Any type of notification and/or solicitation to one or more potential players may be transmitted as indicated at 809.

Some embodiments may prevent one or more notifications based on one or more jurisdictional requirements. For example, a notification regarding a game may not be transmitted to a player if the player is not able to play the game in the player's jurisdiction. Some embodiments may include determining whether a game is allowed in a particular jurisdiction associated with a player and may transmit a notification and/or request to join a game based on a determination that such a game is allowed. In some embodiments, a list of available players for a game in a player's friend list may be filtered based on a jurisdiction associated with each player. For example, a player may only be shown players that are in a jurisdiction in which the game is legal. In some embodiments, if a player is near a border that may be crossed into a jurisdiction where a game may be legal, such a player may also be shown in such a display and/or notified as an enticement to cross the border.

Figure 9:
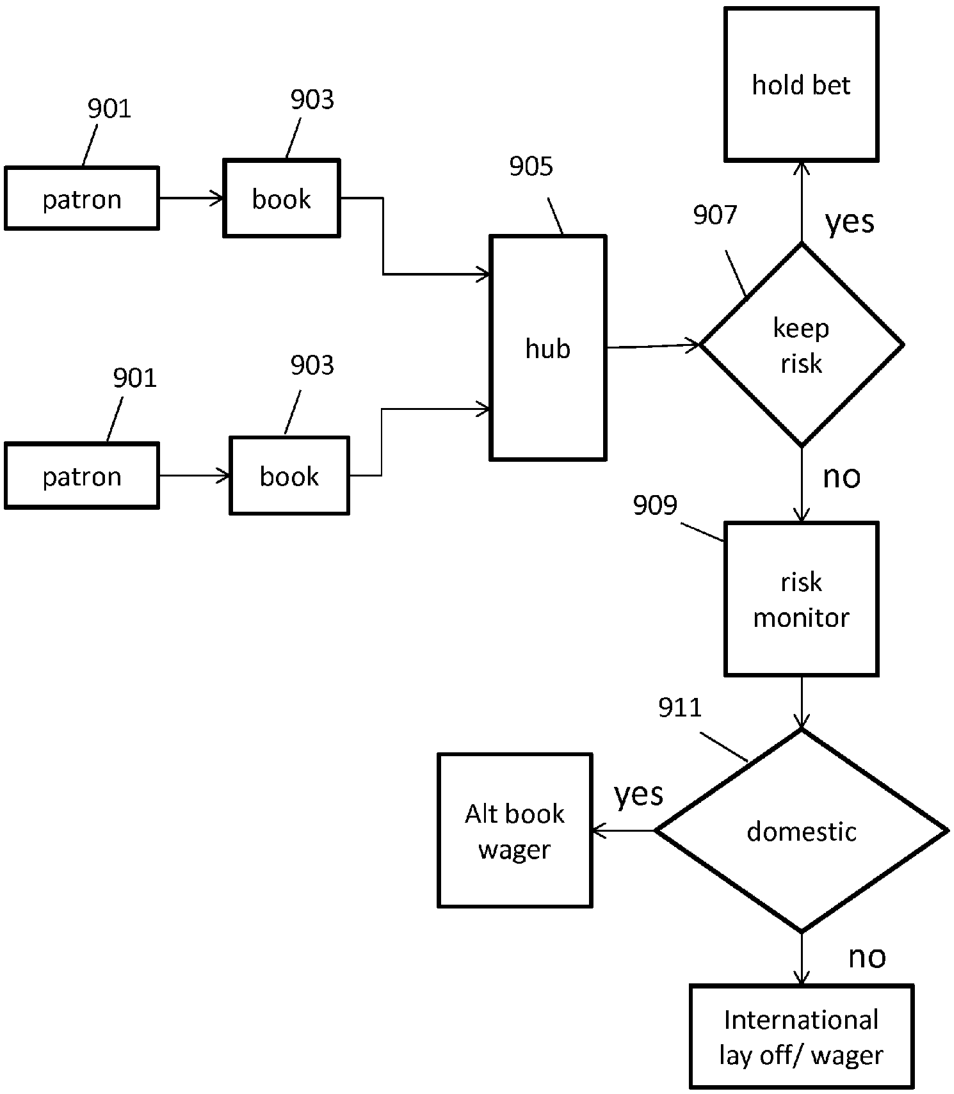
FIG. 9 shows an example method according to some embodiments.

Some embodiments may include a risk management element. Such an element may be a module of a gaming system such as the one shown in FIG. 8. FIG. 9 illustrates an example of a risk management module that may be used in some embodiments. Patrons 901 associated with one or more gaming operations (e.g., operations that may be in different jurisdictions and/or different locations) may place one or more wagers (e.g., wagers in any desired game such as a sports book game and/or a casino game). In some embodiments, although the users may place the bets at different locations and/or through different devices 903, the gaming provider may have a single risk pool 905 associated with the bets combined. For example, a single gaming operator such as the one illustrated in FIG. 8 may take wagers from a plurality of locations and/or jurisdictions so that operator may assume the risk of such wagers. In other embodiments as discussed elsewhere, different gaming operators may separately assume elements of risk separately rather than a single gaming operator assuming the risk from activities in different locations or through different accounts.

In some embodiments, a determination of whether to maintain the risk for one or more wagers may be made as indicated at 907. Such a determination may be made based on a risk tolerance of the gaming operator. For example, a gaming operator may desire to take no more than X dollars in risk for a particular event occurring (e.g., that a team will win in a sports game, that a player will win in a casino game, that a outcome will occur in a game, etc.). If a new wager does not exceed such a threshold then a determination may be made to keep the risk. If a new wager does exceed such a threshold then a determination may be made that the risk should not be kept. In some embodiments, wagers on different things may at least in part be treated as a same risk (e.g., a wager that a player will win a game may be treated as similar to a wager that the same player may get a royal flush in the game, a wager that a team will win may be treated as a same risk that a team will win a first half of a game, etc.).

In some embodiments, a risk monitor element 909 may attempt to offload some amount of risk that an event occurs based on a determination that a gaming operator has taken on more than a threshold amount of risk. The illustrated example shows a decision 911 being made based on whether each part of the risk is domestic or international and making potentially different attempts to offload the risk based on such a determination. In some embodiments, it should be recognized that various jurisdictions at any level of granularity may have different regulations regarding offloading of risk and so different determinations regarding how such risk offloading should be made may be made based on any level of granularity of jurisdictions (e.g., state by state).

In some embodiments, one or more wagers for a over-risked event may be attempted to be offloaded through one or more risk offloading systems. For example, if a wager for the over-risked event is made in a jurisdiction in which wager exchanges are legal, the wager may be sold and/or a counter wager may be entered into through such a wager exchange. In some embodiments, if such a wager is made in a jurisdiction in which such offloading is not legal, a counter wager may be entered into in another jurisdiction (e.g., a gaming operator may place a wager at another gaming operator that the event will not happen (e.g., if the wager is a wager that the event will happen). It should be recognized that any business rules and/or jurisdictional rules may be followed regarding offloading of risk.

Figure 11:
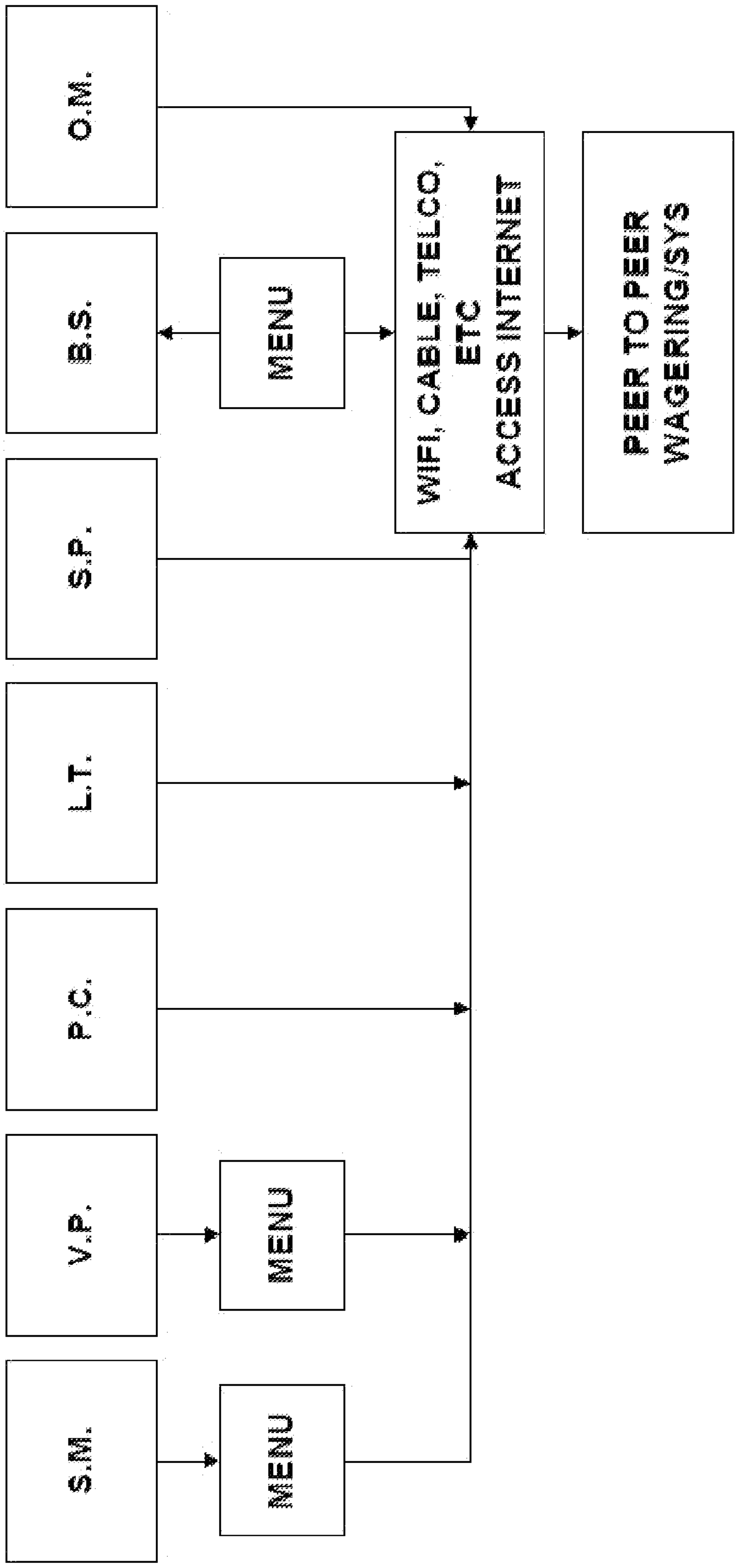
FIG. 11 shows an example of systems accessing a game according to some embodiments.

FIG. 11 illustrates an example set of systems accessing a gaming service. It should be recognized that such systems are given as non-limiting examples only, that a peer to peer gaming system illustrated is given as a non-limiting example only, and that a set of menus, connections, and/or networks are given as non-limiting examples only.

As illustrated, some embodiments may allow a user to access a game and/or play against another user that is allowed to access the same game. Such users may access the game using a same or different device. Some example devices illustrated in FIG. 11 include a slot machine, a video poker machine, a personal computer, a laptop, a smart phone, a betting station, and/or any other type of electronic and/or physical method of accessing a game that may be desired.

In some embodiments, one or more devices may operate a piece of software (e.g., a web browser, a mobile phone application, a menu system, a proprietary piece of software, and so on) and/or set of hardware that allows the game to be accessed at a remote location (e.g., a peer to peer wagering center). In some embodiments, at least part of an execution of a game may take place at a device (e.g., rendering of graphics, input, formatting of a display, and so on). In some embodiments, no part of execution of a game may take place at a device.

For example, in some embodiments, a user may use a smart phone app on a smart phone to access a peer to peer game, another user may use a web browser on a laptop to access the peer to peer game, another user may use a proprietary piece of software on a personal computer to access the peer to peer game, another user may use a menu system of a kiosk to access software for the peer to peer game, and so on.

In some embodiments, a slot machine, video poker machine, betting station, and/or any type of gaming or electronic device may allow a user to access a menu system through which the user may adjust the device from play of one game to play of another game (e.g., a slot machine may be changed from a slot machine to a peer to peer gaming machine by accessing such a menu system). In some embodiments, in response to accessing such a menu system, a piece of software may be downloaded to the machine to allow play of the selected game (e.g., a software that instructs the device how to render images, how to present video, how to present images, how to present audio, how to play the game, how to format information, and so on).

Some embodiments may include transmitting information regarding play of a game from a gaming system (e.g., peer to peer gaming system) to a device. In some embodiments, the information may be formatted based on the device accessing the game. In some embodiments, for a single game, different information may be sent to different devices because the devices may require different formatting or types of information to play the game. Some embodiments may include determining information to be sent to a device based on the type of device. For example, in some embodiments, a lower resolution image may be sent to one device than another device. As another example, in some embodiments sound that is in one formation may be sent to one device and no sound may be sent to another device. As yet another example, in some embodiments, video that is encoded using one codec may be sent to one device and video that is encoded using another codec may be sent to a different device. Some embodiments, may prevent some information from being sent for inclusion in an interface based on a device type. Some embodiments may prevent certain games from being played based on device type (e.g., in response to a determination that a device does not have hardware needed to support a game type a game may be removed from a menu system of game offered by the peer to peer gaming system), prevent certain device types to be matched together, prioritize certain games for certain devices, prioritize certain matching of players based on device type, and so on.

Some embodiments may allow access form one or more devices through a communication network such as a Wi-Fi network, a cable network, the internet, a telephone network, and so on. It should be recognized that any system may use or not use any type of menu system, network, software, hardware, and so on in any combination to provide access to any type of game.

In some embodiments, a user may access an account of money that may be used to place wagers in a game. Such an account may be maintained by a gaming operator as discussed herein. Such a gaming operator may include an operator that operates a peer to peer or other gaming system as indicated at FIG. 11. Such a gaming operator may include a casino or other operator that may allow access by its player's to a peer to peer or other gaming center. Money in such an account may be used to place wagers in a game. For example, money in an account associated with a casino may be used to place wagers in a game played at a peer to peer gaming center through a mobile device of the user. In some embodiments, money may be placed in a coin, dollar, ticket in ticket out, or other money depositing system at a gaming device (e.g., at a slot machine, kiosk, betting station, video poker system, and so on). Such deposited money may be used to play games offered through a peer to peer gaming center. Such deposited money may be added to an account and/or treated as a separate account.

In some embodiments, for example, a user may deposit money into a slot machine, access a menu on the slot machine to indicate a desire to play a peer to peer game through a peer to peer gaming center, be presented with a game, be allowed to use the money entered into the slot machine to place wagers in the game. The peer to peer gaming center may determine the amount deposited into the slot machine, direct the slot machine to add or subtract money to the balance in the slot machine based on play of the game, allow wagers based on the amount deposited into the slot machine, and so on. In some embodiments, the peer to peer gaming center may maintain accounting regarding money won or lost through such a game so that an account may be reconciled with a gaming operator that may operate the slot machine (e.g., the casino in which the slot machine is placed). For example, the user may be allowed to take their winning out of the slot machine, but those winnings may be from the casino at which the player is playing. The peer to peer center may compensate the casino for such winnings in some embodiments. In some embodiments, amounts lost in the game may be owed from the casino to the peer to peer gaming center. In some embodiments, winnings and/or losses may be attributed across multiple entities (e.g., other gaming operators, a casino and a peer to peer center, and so on in any combination). Some embodiments may include determining an amount owed and/or due to one or more of a plurality of gaming operators based on game play of one or more games (e.g., based on players being from the gaming operators, based on a gaming operator providing the game, based on a machine used to play the game being provided by the gaming operator, and so on).

In some embodiments, a user at a gaming device may desire to play a multiplayer game but may be delayed from doing so. For example, other players may not be available at the moment the player desires to play, a regulation may require a delay, another player may not be available at a same property and a time period may be used before a player is found at another location, and so on. During that delay, some embodiments may allow a player to play another game. For example, a player may be allowed to play a slot machine game from a slot machine while the slot machine (e.g., through a menu system) keeps the player in a queue for some other game. In some embodiments, when the player is matched or the delay is ended, the player may be placed in a game in response to the delay ending (e.g., after a current game is finished, interrupting the current game, etc.).

In some embodiments, taxes that may be due from a winner or from a gaming operator to a particular jurisdiction may vary from jurisdiction to jurisdiction. For example, in some embodiments, in a first state, a winner playing in that state may owe a first percentage of taxes to the state, but a player playing in a second state may owe a different second percentage of taxes to the second state. In some jurisdictions, losses form play may be offset winnings. In some jurisdictions such losses may not offset winnings. In some embodiments, a gaming operator may be required to pay a percentage of earnings based on where those earnings are made. In some embodiments, a jurisdiction may consider the earnings made where the game is played by the player and/or where a server or other hardware executing the game is located. In some embodiments, a module may monitor such rules and/or apply appropriate tax law based on the rules. For example, in some embodiments, a player may have taxes withheld and/or a tax document generated based on the rules. In some embodiments, information about earnings may be monitored and/or stored such that appropriate taxes may be paid (e.g., earnings may be marked with appropriate tax information for later payment of taxes).

In some embodiments, different games may be regulated differently in different jurisdictions. For example, different speeds may be allowed, different bets may be allowed, different maximum or minimum wagers may be allowed, different random number generation may be allowed, different accounts may be used, and so on. In some embodiments, a game may be adjusted so that both players of the game are presented with a similar gaming experience. In some embodiments this may include adjusting a first player's game so that it complies with a second player's jurisdiction. For example, in some embodiments, a first player's jurisdiction may allow a first type of bet or a maximum bet that is not allow or that is higher than a second player's jurisdiction. In response to such a determination, the first player's game maybe adjusted such that the first player is not able to make that bet or is restricted to the maximum bet amount of the second player's jurisdiction. Although such an example is given in terms of jurisdiction, it should be recognized that any level of location, time, device, service, gaming operator, and so may be used such that one player may affect gaming options presented to a second player.

It should be recognized that an embodiment may include one or more components of any embodiment described herein or elsewhere in any combination and/or arrangement. Some embodiments may include no such elements at all but may include alternative, different, additional, fewer, and so on elements. It should be recognized that some other embodiments may include various features in any combination. Other embodiments may include different, additional, alternative, fewer, more, and so on features in any combination.

XXII. Embodiments

The following should be understood to be embodiments and not claims.

A. A method comprising: determining, by a computing device, that a first player and second player desire to start play of a game, in which the first player and the second player are both associated with a first gaming operator; in response to the determination, facilitating, by the computing device, play of a first hand of the game between the first player and the second player; in response to facilitating play of the first hand of the game by the first and second players, allocating, by the computing device, a first payment to the first gaming operator based on the first and second player both being associated with the first gaming operator; determining, by the computing device, that a third player desires to start play of the game, in which the third player is associated with the first gaming operator; determining, by the computing device, that a fourth player desires to start play of the game, in which the fourth player is associated with a second gaming operator; determining, by the computing device, that no additional players associated with the first gaming operator desires to start play of the game; determining, by the computing device, that no additional player associated with the second gaming operator desires to start play of the game; in response to determining that the third and fourth players desire to start play of the game, and that no other players associated with either the first or the second gaming operators desire to play the game, facilitating, by the computing device, play of a second hand of the game between the third and the fourth players; and in response to facilitating play of the second hand of the game by the third and fourth players, allocating, by the computing device, a second payment to the first gaming operator and a third payment to the second gaming operator based on the third player being associated with the first gaming operator and the fourth player being associated with the fourth gaming operator.

A.1. The method of claim A, in which the first payment, the second payment, and the third payment include portions of at least one of respective rakes and respective buy in fees. A.2. The method of claim A, in which the game includes a poker game. A.3. The method of claim A, in which the first gaming operator and the second gaming operator include separate casinos. A.4. The method of claim A, in which determining that no additional player associated with the first gaming operator desires to start play of the game includes determining that no additional player desires to start play of the game in a particular time period after the determination that the third player desires to start play of the game.

A.5. The method of claim A, in which the computing device includes a gaming server of the first gaming operator. A.6. The method of claim A, in which the computing device includes a device of an intermediary between the first gaming operator and the second gaming operator. A.7. The method of claim A, in which facilitating play of the first hand and the second hand includes determining cards for each of the first hand and the second hand, determining outcomes of the first hand and the second hand, and presenting information regarding the cards and the outcomes through respective mobile devices. A.8. The method of claim A, in which the game includes a game having characteristics specified by the first, second, third, and fourth players. A.8.1. The method of claim A.8, in which the characteristics includes at least one of a minimum wager, a raise restriction, and a maximum wager.

A.9. The method of claim A, in which the second hand includes at least one additional player associated with the first gaming operator and allocating the second payment and the third payment includes allocating the payment based on a distribution of players in the second hand between the first and second gaming operator. A.10. The method of claim A.9, in which the second and third payments are allocated to match the distribution. A.11. The method of claim A, in which the second hand includes at least one additional player associated with a third gaming operator and the method includes allocating a fourth payment to the third gaming operator.

A.12. The method of claim A, comprising: determining a first tax requirement for the third a player based on a first jurisdiction of the first gaming operator; determining a second tax requirement for the fourth player based on a second jurisdiction of the second gaming operator; and applying the first tax requirement to the third player and the second tax requirement to the fourth player. A.13. The method of claim A.12, in which at least one of the first and second tax requirements includes at least one of a tax withholding and a tax reporting.

A.15. The method of claim A, comprising: determining that the third player wins an amount of money through play of the game and allocating a first portion of that amount to be paid from the first gaming operator and a second portion of that amount to be paid from the second gaming operator. A.15.1. The method of claim A.15, in which the game includes a tournament and the amount includes an amount for winning the tournament. A.16. The method of claim A, in which the game includes a tournament and in which facilitating play of the second hand includes placing each of the third and fourth players at a virtual table involved in the tournament.

B. A method comprising: determining, by a computing device, that a third player desires to start play of the game, in which the third player is associated with the first gaming operator; determining, by the computing device, that a fourth player desires to start play of the game, in which the fourth player is associated with a second gaming operator; determining, by the computing device, that no additional players associated with the first gaming operator desires to start play of the game; determining, by the computing device, that no additional player associated with the second gaming operator desires to start play of the game; in response to determining that the third and fourth players desire to start play of the game, and that no other players associated with either the first or the second gaming operators desire to play the game, facilitating, by the computing device, play of a second hand of the game between the third and the fourth players; and in response to facilitating play of the second hand of the game by the third and fourth players, allocating, by the computing device, a second payment to the first gaming operator and a third payment to the second gaming operator based on the third player being associated with the first gaming operator and the fourth player being associated with the fourth gaming operator.

C. An apparatus comprising: a non-transitory machine readable medium having stored thereon a plurality of instructions that when executed by a computing device cause the computing device to: determine that a third player desires to start play of the game, in which the third player is associated with the first gaming operator; determine that a fourth player desires to start play of the game, in which the fourth player is associated with a second gaming operator; determine that no additional players associated with the first gaming operator desires to start play of the game; determine that no additional player associated with the second gaming operator desires to start play of the game; in response to determining that the third and fourth players desire to start play of the game, and that no other players associated with either the first or the second gaming operators desire to play the game, facilitate play of a second hand of the game between the third and the fourth players; and in response to facilitating play of the second hand of the game by the third and fourth players, allocate a second payment to the first gaming operator and a third payment to the second gaming operator based on the third player being associated with the first gaming operator and the fourth player being associated with the fourth gaming operator.

What is claimed is:

1. A method comprising:

determining, by a computing device, that a first player and second player desire to start play of a game, in which the first player and the second player are both associated with a first gaming operator;

in response to the determination, facilitating, by the computing device, play of a first hand of the game between the first player and the second player, in which facilitating play of the first hand of the game between the firsts player and the second player includes giving preference to a matching of the first player and the second player into the game based on the first player and second player being associated with a same gaming operator;

in response to facilitating play of the first hand of the game by the first and second players, allocating, by the computing device, a first payment to the first gaming operator based on the first and second player both being associated with the first gaming operator;

determining, by the computing device, that a third player desires to start play of the game, in which the third player is associated with the first gaming operator;

determining, by the computing device, that a fourth player desires to start play of the game, in which the fourth player is associated with a second gaming operator;

in response to determining that the third and fourth players desire to start play of the game, facilitating, by the computing device, play of a second hand of the game between the third and the fourth players based on (1) subordinated player matching across gaming operators in favor of matching within a single gaming operator and (2) there being no other players associated with either the first or the second gaming operators looking to play the game; and in response to facilitating play of the second hand of the game by the third and fourth players, allocating, by the computing device, a second payment to the first gaming operator and a third payment to the second gaming operator based on the third player being associated with the first gaming operator and the fourth player being associated with the second gaming operator.

2. The method of claim 1, in which the first payment, the second payment, and the third payment include portions of at least one of respective rakes and respective buy in fees.

3. The method of claim 1, in which the game includes a poker game.

4. The method of claim 1, in which the first gaming operator and the second gaming operator include separate casinos.

5. The method of claim 1, comprising determining that no additional player associated with the first gaming operator desires to start play of the game, in which such determining includes determining that no additional player desires to start play of the game in a particular time period after the determination that the third player desires to start play of the game.

6. The method of claim 1, in which the computing device includes a gaming server of the first gaming operator.

7. The method of claim 1, in which the computing device includes a device of an intermediary between the first gaming operator and the second gaming operator.

8. The method of claim 1, in which facilitating play of the first hand and the second hand includes determining cards for each of the first hand and the second hand, determining outcomes of the first hand and the second hand, and presenting information regarding the cards and the outcomes through respective mobile devices.

9. The method of claim 1, in which the game includes a game having characteristics specified by the first, second, third, and fourth players.

10. The method of claim 9, in which the characteristics includes at least one of a minimum wager, a raise restriction, and a maximum wager.

11. The method of claim 1, in which the second hand includes at least one additional player associated with the first gaming operator and allocating the second payment and the third payment includes allocating the payment based on a distribution of players in the second hand between the first and second gaming operator.

12. The method of claim 11, in which the second and third payments are allocated to match the distribution.

13. The method of claim 1, in which the second hand includes at least one additional player associated with a third gaming operator and the method includes allocating a fourth payment to the third gaming operator.

14. The method of claim 1, comprising:

determining a first tax requirement for the third a player based on a first jurisdiction of the first gaming operator;

determining a second tax requirement for the fourth player based on a second jurisdiction of the second gaming operator; and applying the first tax requirement to the third player and the second tax requirement to the fourth player.

15. The method of claim 14, in which at least one of the first and second tax requirements includes at least one of a tax withholding and a tax reporting.

16. The method of claim 1, comprising:

determining that the third player wins an amount of money through play of the game and allocating a first portion of that amount to be paid from the first gaming operator and a second portion of that amount to be paid from the second gaming operator.

17. The method of claim 16, in which the game includes a tournament and the amount includes an amount for winning the tournament.

18. The method of claim 1, in which the game includes a tournament and in which facilitating play of the second hand includes placing each of the third and fourth players at a virtual table involved in the tournament.

19. A method comprising:

determining, by a computing device, that a first player desires to start play of a game, in which the first player is associated with a first gaming operator;

determining, by the computing device, that a second player desires to start play of the game, in which the second player is associated with a second gaming operator;

in response to determining that the first and second players desire to start play of the game, facilitating, by the computing device, play of a hand of the game between the first and the second players based on (1) subordinated player matching across gaming operators in favor of matching within a single gaming operator and (2) there being no other players associated with either the first or the second gaming operators looking to play the game; and in response to facilitating play of the hand of the game by the first and second players, allocating, by the computing device, a first payment to the first gaming operator and a second payment to the second gaming operator based on the first player being associated with the first gaming operator and the second player being associated with the second gaming operator.

20. An apparatus comprising:

a non-transitory machine readable medium having stored thereon a plurality of instructions that when executed by a computing device cause the computing device to:

determine that a first player desires to start play of a game, in which the first player is associated with a first gaming operator;

determine that a second player desires to start play of the game, in which the second player is associated with a second gaming operator;

determine that no additional players associated with the first gaming operator desires to start play of the game;

determine that no additional player associated with the second gaming operator desires to start play of the game;

in response to determining that the first and second players desire to start play of the game, facilitate play of a hand of the game between the first and the second players based on (1) subordinated player matching across gaming operators in favor of matching within a single gaming operator and (2) there being no other players associated with either the first or the second gaming operators looking to play the game; and in response to facilitating play of the hand of the game by the first and second players, allocate a first payment to the first gaming operator and a second payment to the second gaming operator based on the first player being associated with the first gaming operator and the second player being associated with the second gaming operator.

* * * * *